(12) United States Patent
Zhu et al.

(10) Patent No.: US 12,368,476 B2
(45) Date of Patent: Jul. 22, 2025

(54) SIGNAL PROCESSING METHOD AND RELATED APPARATUS

(71) Applicant: Huawei Technologies Co., Ltd., Shenzhen (CN)

(72) Inventors: Qian Zhu, Shenzhen (CN); Rui Ni, Shenzhen (CN); Yi Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 18/302,205

(22) Filed: Apr. 18, 2023

(65) Prior Publication Data
US 2023/0299819 A1 Sep. 21, 2023

Related U.S. Application Data

(63) Continuation of application No. PCT/CN2021/120237, filed on Sep. 24, 2021.

(30) Foreign Application Priority Data

Oct. 19, 2020 (CN) .......................... 202011120152.7

(51) Int. Cl.
*H01Q 21/06* (2006.01)
*H01Q 1/48* (2006.01)
(Continued)

(52) U.S. Cl.
CPC ............ *H04B 7/0456* (2013.01); *H01Q 1/48* (2013.01); *H01Q 9/045* (2013.01); *H01Q 21/00* (2013.01); *H01Q 21/26* (2013.01)

(58) Field of Classification Search
CPC ...... H01Q 1/38–48; H01Q 1/243; H01Q 1/52; H01Q 21/00; H01Q 21/26; H01Q 21/30; H01Q 21/065
See application file for complete search history.

(56) References Cited

U.S. PATENT DOCUMENTS 11,652,301 B2 * 5/2023 Yang .................... H01Q 19/005
343/700 MS

OTHER PUBLICATIONS

3GPP TS 38.211 V15.6.0 (Jun. 2019), "3rd Generation Partnership Project; Technical Specification Group Radio Access Network; NR;Physical channels and modulation(Release 15)", total 97 pages.
(Continued)

*Primary Examiner* — Hasan Islam
(74) *Attorney, Agent, or Firm* — Slater Matsil, LLP

(57) ABSTRACT

An antenna includes: a dielectric plate provided with a first surface and a second surface; a ground plane located on the first surface; and an antenna unit. A size of the antenna unit is a preset length, the antenna unit includes at least three antenna elements in a ring arrangement, and each antenna element includes a first patch, a second patch, and a third patch that are located on the second surface, and three conductive portions that penetrate through the first surface and the second surface. A first conductive portion is electrically connected between a feeding portion and the first patch to form a monopole, a second conductive portion is electrically connected between the ground plane and the second patch to form a first parasitic body, a third conductive portion is electrically connected between the ground plane and the third patch to form a second parasitic body, and the first parasitic body and the second parasitic body are located on both sides of the monopole and are configured to isolate adjacent antenna elements in the ring arrangement.

19 Claims, 15 Drawing Sheets

(51) Int. Cl.
*H01Q 9/04* (2006.01)
*H01Q 21/00* (2006.01)
*H01Q 21/26* (2006.01)
*H04B 7/0456* (2017.01)

(56) References Cited

OTHER PUBLICATIONS

3GPP TS 38.212 V15.6.0 (Jun. 2019), "3rd Generation Partnership Project; Technical Specification Group Radio Access Network;NR;Multiplexing and channel coding(Release 15)", total 101 pages.
3GPP TS 38.214 V15.6.0 (Jun. 2019), "3rd Generation Partnership Project; Technical Specification Group Radio Access Network; NR;Physical layer procedures for data(Release 15)", total 105 pages.

* cited by examiner

Circular array of a transmitting end device

Circular array of a receiving end device

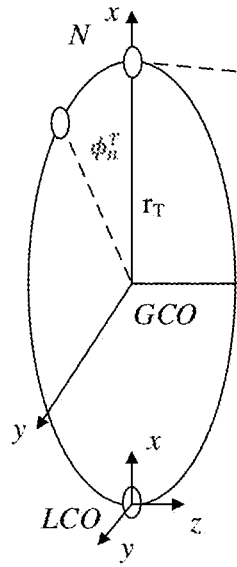
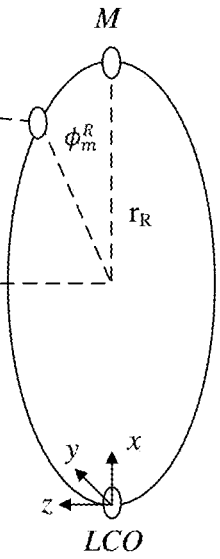

$r_T$: radius of the circular array of the transmitting end device
$r_R$: radius of the circular array of the receiving end device
$d_{mn}$: distance from an antenna unit n of the transmitting end device to an antenna unit m of the receiving end device
GCO: global coordinate system of a transceiver system including the transmitting end device and the receiving end device
LCO: local coordinate system of an antenna unit in the transmitting end device or the receiving end device
$\phi_n^T$: azimuth of the antenna unit n of the transmitting end device in the circular array of the transmitting end device
$\phi_m^R$: azimuth of the antenna unit m of the receiving end device in the circular array of the receiving end device
N: quantity of triple-polarization antenna units of the transmitting end device
M: quantity of triple-polarization antenna units of the receiving end device

FIG. 18

SIGNAL PROCESSING METHOD AND RELATED APPARATUS

CROSS-REFERENCE TO RELATED APPLICATIONS

This application is a continuation of International Application No. PCT/CN2021/120237, filed on Sep. 24, 2021, which claims priority to Chinese Patent Application No. 202011120152.7, filed on Oct. 19, 2020. The disclosures of the aforementioned applications are hereby incorporated by reference in their entireties.

TECHNICAL FIELD

This application relates to the field of communication technologies, and in particular, to an antenna, a channel state information transmission method, and a related apparatus.

BACKGROUND

At present, to improve performance of an antenna, an orthogonally polarized beam is usually used to improve a multi-input multi-output (MIMO) capacity while ensuring that an antenna diameter remains unchanged. For example, a dual-polarization antenna is coupled and fed by two mutually orthogonal microstrips through a cross-crossed slot, and energy is coupled from each microstrip to a patch through a slot perpendicular to the microstrip, so that the dual-polarization antenna can radiate a beam of horizontal polarization and a beam of vertical polarization, thereby doubling a MIMO capacity while ensuring that an antenna diameter remains unchanged. For another example, a three-port antenna with three orthogonal beams generated by a three-dimensional structure uses a bending patch design, so that a size of an antenna plane is less than half a wavelength, thereby improving a MIMO capacity while ensuring that an antenna diameter remains unchanged.

However, the dual-polarization antenna provided in the existing solution can generate only two types of polarized beams, resulting in low MIMO capacity improvement effect and a low space diversity capacity. In addition, the three-port antenna provided in the existing solution is an antenna of a three-dimensional structure that works at a low frequency. Because a wavelength of a low-frequency electromagnetic wave is long, and a size of the antenna is large, a bending structure has low requirements on a processing technology. However, because a wavelength of a high-frequency electromagnetic wave is short, and a size of an antenna is small, a bending structure has high requirements on a processing technology. Therefore, the antenna of the three-dimensional structure cannot be applied to a high frequency. To sum up, a technical means is urgently needed to resolve the foregoing technical problem.

SUMMARY

This application provides an antenna, a channel state information transmission method, and a related apparatus.

According to a first aspect, an antenna is provided, including: a dielectric plate provided with a first surface and a second surface; a ground plane located on the first surface; and an antenna unit, where a size of the antenna unit is a preset length, the antenna unit includes at least three antenna elements in a ring arrangement, and each antenna element includes a first patch, a second patch, and a third patch that are located on the second surface, three conductive portions that penetrate through the first surface and the second surface, and a feeding portion connected to the first surface, where a first conductive portion is electrically connected between the feeding portion and the first patch to form a monopole, a second conductive portion is electrically connected between the ground plane and the second patch to form a first parasitic body, a third conductive portion is electrically connected between the ground plane and the third patch to form a second parasitic body, and the first parasitic body and the second parasitic body are located on both sides of the monopole and are configured to isolate adjacent antenna elements in the ring arrangement.

It can be learned that, in the foregoing technical solution, at least three antenna elements in a ring arrangement are used, and a first parasitic body and a second parasitic body are located on both sides of a monopole, and are configured to isolate adjacent antenna elements in the ring arrangement. In this way, when a size of an antenna unit is a preset length, three types of polarized beams are generated by using a planar structure, so that a MIMO capacity is greatly improved, and a space diversity capacity is high. In addition, it is avoided that a three-dimensional structure needs to be used in an existing solution to implement generation of three types of polarized beams, so that a requirement on processing technologies is reduced, and the antenna is applicable to both a high frequency and a low frequency.

Optionally, the preset length is close to or equal to half a wavelength.

Optionally, either of the first parasitic body and the second parasitic body is located between monopoles of the adjacent antenna elements in the at least three antenna elements.

It can be learned that, in the foregoing technical solution, isolation of adjacent antenna elements is implemented.

Optionally, the first patch, the second patch, and the third patch of at least one of the at least three antenna elements are electrically connected, or there are gaps among the first patch, the second patch, and the third patch of at least one of the at least three antenna elements.

It can be learned that, in the foregoing technical solution, a first patch, a second patch, and a third patch of at least one of at least three antenna elements are electrically connected, so that an electromagnetic wave radiation area is increased, thereby improving an antenna gain. There are gaps among the first patch, the second patch, and the third patch of at least one of the at least three antenna elements. Because capacitance effect is introduced by the gaps among patches, the capacitance effect is offset by inductance effect of conductive portions, thereby improving a matching bandwidth of the antenna elements.

Optionally, there is a gap or electrical connection between the second patch of at least one of the at least three antenna elements and a third patch of an adjacent antenna element.

It can be learned that, in the foregoing technical solution, there is a gap between a second patch of at least one of at least three antenna elements and a third patch of an adjacent antenna element, thereby improving isolation of adjacent antenna elements. The second patch of the at least one of the at least three antenna elements is electrically connected to the third patch of the adjacent antenna element, thereby reducing process complexity caused by a gap. In addition, for a single antenna element, an electromagnetic wave radiation area is increased, thereby improving an antenna gain.

Optionally, the second patch of the at least one of the at least three antenna elements and the third patch of the adjacent antenna element are electrically connected to at least two conductive portions, and the at least two conductive portions are electrically connected to the ground plane.

It can be learned that, in the foregoing technical solution, a second patch of at least one of at least three antenna elements and a third patch of an adjacent antenna element are electrically connected to at least two conductive portions, thereby improving isolation of adjacent antenna elements, improving impedance matching, and improving an antenna gain.

Optionally, a conductive portion corresponding to the second patch of the at least one of the at least three antenna elements is a conductive portion corresponding to the third patch of the adjacent antenna element.

It can be learned that, in the foregoing technical solution, a conductive portion corresponding to a second patch of at least one of at least three antenna elements is a conductive portion corresponding to a third patch of an adjacent antenna element, thereby reducing a quantity of conductive portions, and reducing complexity of a structure and a process.

Optionally, the ring arrangement includes a first ring arrangement and a second ring arrangement, and the first ring arrangement is obtained by rotating the second ring arrangement by a preset angle at a geometric center of the antenna.

According to a second aspect, an antenna array is provided. The antenna array includes the antenna according to any one of the first aspect, and a first ring arrangement and a second ring arrangement are the same or different.

It can be learned that, in the foregoing technical solution, isolation of adjacent antennas is improved by using different ring arrangements.

According to a third aspect, a channel state information transmission method is provided. The method is applied to a transmitting end device, and the method includes: sending a first reference signal; receiving first indication information sent by a receiving end device, where the first indication information is used to indicate a first precoding matrix, and the first precoding matrix is determined based on the first reference signal; determining a second precoding matrix based on the first indication information; and sending data precoded based on the second precoding matrix to the receiving end device, where the sending a first reference signal includes: sending a second reference signal on a first virtual port of the transmitting end device; receiving a third reference signal that is sent by the receiving end device to the transmitting end device on a first virtual port of the receiving end device, where the first virtual port of the receiving end device is determined based on first angle of arrival information, and the first angle of arrival information is determined by the receiving end device based on the second reference signal; determining second angle of arrival information based on the third reference signal; and sending the first reference signal to the receiving end device on a second virtual port of the transmitting end device based on the second angle of arrival information.

It can be learned that, in the foregoing technical solution, different virtual ports are configured, and different reference signals are sent on the different virtual ports, so that a second precoding matrix is more accurately determined, to transmit data precoded based on the second precoding matrix.

Optionally, the sending the first reference signal to the receiving end device on a second virtual port of the transmitting end device based on the second angle of arrival information includes: determining a third precoding matrix based on the second angle of arrival information, where the third precoding matrix is a precoding matrix of antenna elements in a first antenna unit of the transmitting end device, the third precoding matrix includes a matrix with n rows and m columns, n is a quantity of antenna elements in the first antenna unit of the transmitting end device, and m is a quantity of second virtual ports in the first antenna unit of the transmitting end device; and sending the first reference signal to the receiving end device on virtual ports indicated by the m columns in the third precoding matrix.

It can be learned that, in the foregoing technical solution, a virtual port is determined by using a third precoding matrix, and a reference signal is sent on the virtual port, so that multi-polarization omnidirectional and directional beams are implemented, thereby improving a space diversity capacity and robustness of a transmission system.

Optionally, if the second angle of arrival information is greater than or equal to a first threshold, the third precoding matrix is a precoding matrix used to generate first polarization and second polarization, or the third precoding matrix is a precoding matrix used to generate first polarization and third polarization; if the second angle of arrival information is greater than or equal to a second threshold and the second angle of arrival information is less than a first threshold, the third precoding matrix is a precoding matrix used to generate first polarization, second polarization, and third polarization; or if the second angle of arrival information is less than a second threshold, the third precoding matrix is a precoding matrix used to generate second polarization and third polarization.

It can be learned that, in the foregoing technical solution, a third precoding matrix is determined in different cases.

Optionally, the second precoding matrix is determined based on the first precoding matrix and the third precoding matrix, and the second precoding matrix is a precoding matrix of an antenna of the transmitting end device; the first precoding matrix includes a matrix with e rows and f columns, where e is a quantity of second virtual ports of x antenna units of the transmitting end device, f is a quantity of data streams transmitted through the second virtual ports of the x antenna units of the transmitting end device, and the x antenna units are configured to send the first reference signal; and the second precoding matrix includes a matrix with i rows and j columns, where i is a quantity of all antenna elements in the x antenna units of the transmitting end device, and j is a quantity of data streams transmitted by all antenna elements in the x antenna units of the transmitting end device.

Optionally, if the first precoding matrix is $$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

and the third precoding matrix is $$\begin{bmatrix} 1 & 1 & 1 \\ 1 & -1 & -1 \\ 1 & j & -j \\ 1 & -j & j \end{bmatrix},$$

the second precoding matrix is $$\begin{bmatrix} 1 & 1 & 1 & 0 & 0 & 0 \\ 1 & -1 & -1 & 0 & 0 & 0 \\ 1 & j & -j & 0 & 0 & 0 \\ 1 & -j & j & 0 & 0 & 0 \\ 0 & 0 & 0 & 1 & 1 & 1 \\ 0 & 0 & 0 & 1 & -1 & -1 \\ 0 & 0 & 0 & 1 & j & -j \\ 0 & 0 & 0 & 1 & -j & j \end{bmatrix},$$

where 1 in any row of the first precoding matrix is used to indicate to transmit, on a second virtual port corresponding to 1 in any row, a data stream in a column in which 1 in any row is located by using an excitation signal whose amplitude is 1 and phase is 0°; in the third precoding matrix, 1 is used to indicate an excitation signal whose amplitude is 1 and phase is 0°, −1 is used to indicate an excitation signal whose amplitude is 1 and phase is 180°, j is used to indicate an excitation signal whose amplitude is 1 and phase is 90°, and −j is used to indicate an excitation signal whose amplitude is 1 and phase is −90°.

Optionally, the antenna according to the first aspect and the second aspect is deployed in the transmitting end device.

According to a fourth aspect, a channel state information transmission method is provided. The method is applied to a receiving end device, and the method includes: receiving a first reference signal; determining first indication information based on the first reference signal, where the first indication information is used to indicate a first precoding matrix; sending the first indication information to a transmitting end device; and receiving data that is precoded based on a second precoding matrix and that is sent by the transmitting end device, where the second precoding matrix is determined based on the first indication information, and the receiving a first reference signal includes: receiving a second reference signal sent by the transmitting end device on a first virtual port of the transmitting end device; determining first angle of arrival information based on the second reference signal; sending a third reference signal to the transmitting end device on a first virtual port of the receiving end device based on the first angle of arrival information; and receiving the first reference signal that is sent by the transmitting end device to the receiving end device on a second virtual port of the transmitting end device, where the second virtual port of the transmitting end device is determined based on second angle of arrival information, and the second angle of arrival information is determined by the transmitting end device based on the third reference signal.

It can be learned that, in the foregoing technical solution, different virtual ports are configured, and different reference signals are sent on the different virtual ports, so that a second precoding matrix is more accurately determined, to transmit data precoded based on the second precoding matrix.

Optionally, the sending a third reference signal to the transmitting end device on a first virtual port of the receiving end device based on the first angle of arrival information includes: determining a fourth precoding matrix based on the first angle of arrival information, where the fourth precoding matrix is a precoding matrix of antenna elements in a first antenna unit of the receiving end device, the fourth precoding matrix includes a matrix with p rows and q columns, p is a quantity of antenna elements in the first antenna unit of the receiving end device, and q is a quantity of first virtual ports in the first antenna unit of the receiving end device; and sending the third reference signal to the transmitting end device on virtual ports indicated by the q columns in the fourth precoding matrix.

It can be learned that, in the foregoing technical solution, a virtual port is determined by using a fourth precoding matrix, and a reference signal is sent on the virtual port, so that multi-polarization omnidirectional and directional beams are implemented, thereby improving a space diversity capacity and robustness of a transmission system.

Optionally, if the first angle of arrival information is greater than or equal to a first threshold, the fourth precoding matrix is a precoding matrix used to generate first polarization and second polarization, or the fourth precoding matrix is a precoding matrix used to generate first polarization and third polarization; if the first angle of arrival information is greater than or equal to a second threshold and the first angle of arrival information is less than a first threshold, the fourth precoding matrix is a precoding matrix used to generate first polarization, second polarization, and third polarization; or if the first angle of arrival information is less than a second threshold, the fourth precoding matrix is a precoding matrix used to generate second polarization and third polarization.

It can be learned that, in the foregoing technical solution, a fourth precoding matrix is determined in different cases.

Optionally, the antenna according to the first aspect and the second aspect is deployed in the receiving end device.

According to a fifth aspect, a communication apparatus is provided. The apparatus may be a transmitting end device, or a device including a chip and the antenna according to the first aspect and the second aspect. The apparatus includes an obtaining module, an output module, and a processing module, where the output module is configured to send a first reference signal; the obtaining module is configured to receive first indication information sent by a receiving end device, where the first indication information is used to indicate a first precoding matrix, and the first precoding matrix is determined based on the first reference signal; the processing module is configured to determine a second precoding matrix based on the first indication information; and the output module is further configured to send data precoded based on the second precoding matrix to the receiving end device, where when the first reference signal is sent, the output module is configured to send a second reference signal on a first virtual port of the transmitting end device; the obtaining module is configured to receive a third reference signal sent by the receiving end device to the transmitting end device on a first virtual port of the receiving end device, where the first virtual port of the receiving end device is determined based on first angle of arrival information, and the first angle of arrival information is determined by the receiving end device based on the second reference signal; the processing module is further configured to determine second angle of arrival information based on the third reference signal; and the output module is further configured to send the first reference signal to the receiving end device on a second virtual port of the transmitting end device based on the second angle of arrival information.

Optionally, when the first reference signal is sent to the receiving end device on the second virtual port of the transmitting end device based on the second angle of arrival information, the processing module is configured to determine a third precoding matrix based on the second angle of arrival information, where the third precoding matrix is a precoding matrix of antenna elements in a first antenna unit of the transmitting end device, the third precoding matrix includes a matrix with n rows and m columns, n is a quantity of antenna elements in the first antenna unit of the transmitting end device, and m is a quantity of second virtual ports in the first antenna unit of the transmitting end device; and the output module is configured to send the first reference signal to the receiving end device on virtual ports indicated by the m columns in the third precoding matrix.

Optionally, if the second angle of arrival information is greater than or equal to a first threshold, the third precoding matrix is a precoding matrix used to generate first polarization and second polarization, or the third precoding matrix is a precoding matrix used to generate first polarization and third polarization; if the second angle of arrival information is greater than or equal to a second threshold and the second angle of arrival information is less than a first threshold, the third precoding matrix is a precoding matrix used to generate first polarization, second polarization, and third polarization; or if the second angle of arrival information is less than a second threshold, the third precoding matrix is a precoding matrix used to generate second polarization and third polarization.

Optionally, the second precoding matrix is determined based on the first precoding matrix and the third precoding matrix, and the second precoding matrix is a precoding matrix of an antenna of the transmitting end device; the first precoding matrix includes a matrix with e rows and f columns, where e is a quantity of second virtual ports of x antenna units of the transmitting end device, f is a quantity of data streams transmitted through the second virtual ports of the x antenna units of the transmitting end device, and the x antenna units are configured to send the first reference signal; and the second precoding matrix includes a matrix with i rows and j columns, where i is a quantity of all antenna elements in the x antenna units of the transmitting end device, and j is a quantity of data streams transmitted by all antenna elements in the x antenna units of the transmitting end device.

Optionally, if the first precoding matrix is $$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

and the third precoding matrix is $$\begin{bmatrix} 1 & 1 & 1 \\ 1 & -1 & -1 \\ 1 & j & -j \\ 1 & -j & j \end{bmatrix},$$

the second precoding matrix is $$\begin{bmatrix} 1 & 1 & 1 & 0 & 0 & 0 \\ 1 & -1 & -1 & 0 & 0 & 0 \\ 1 & j & -j & 0 & 0 & 0 \\ 1 & -j & j & 0 & 0 & 0 \\ 0 & 0 & 0 & 1 & 1 & 1 \\ 0 & 0 & 0 & 1 & -1 & -1 \\ 0 & 0 & 0 & 1 & j & -j \\ 0 & 0 & 0 & 1 & -j & j \end{bmatrix},$$

where 1 in any row of the first precoding matrix is used to indicate to transmit, on a second virtual port corresponding to 1 in any row, a data stream in a column in which 1 in any row is located by using an excitation signal whose amplitude is 1 and phase is 0°; in the third precoding matrix, 1 is used to indicate an excitation signal whose amplitude is 1 and phase is 0°, −1 is used to indicate an excitation signal whose amplitude is 1 and phase is 180°, j is used to indicate an excitation signal whose amplitude is 1 and phase is 90°, and −j is used to indicate an excitation signal whose amplitude is 1 and phase is −90°.

According to a sixth aspect, a communication apparatus is provided. The apparatus may be a receiving end device, or a device including a chip and the antenna according to the first aspect and the second aspect. The apparatus includes an obtaining module, an output module, and a processing module, where the obtaining module is configured to receive a first reference signal; the processing module is configured to determine first indication information based on the first reference signal, where the first indication information is used to indicate a first precoding matrix; the output module is further configured to send the first indication information to a transmitting end device; and the obtaining module is further configured to receive data that is precoded based on a second precoding matrix and that is sent by the transmitting end device, where the second precoding matrix is determined based on the first indication information, and when the first reference signal is received, the obtaining module is configured to receive a second reference signal sent by the transmitting end device on a first virtual port of the transmitting end device; the processing module is further configured to determine first angle of arrival information based on the second reference signal; the output module is further configured to send a third reference signal to the transmitting end device on a first virtual port of the receiving end device based on the first angle of arrival information; and the obtaining module is further configured to receive the first reference signal that is sent by the transmitting end device to the receiving end device on a second virtual port of the transmitting end device, where the second virtual port of the transmitting end device is determined based on second angle of arrival information, and the second angle of arrival information is determined by the transmitting end device based on the third reference signal.

Optionally, when the third reference signal is sent to the transmitting end device on the first virtual port of the receiving end device based on the first angle of arrival information, the processing module is configured to determine a fourth precoding matrix based on the first angle of arrival information, where the fourth precoding matrix is a precoding matrix of antenna elements in a first antenna unit of the receiving end device, the fourth precoding matrix includes a matrix with p rows and q columns, p is a quantity of antenna elements in the first antenna unit of the receiving end device, and q is a quantity of first virtual ports in the first antenna unit of the receiving end device; and the output module is configured to send the third reference signal to the transmitting end device on virtual ports indicated by the q columns in the fourth precoding matrix.

Optionally, if the first angle of arrival information is greater than or equal to a first threshold, the fourth precoding matrix is a precoding matrix used to generate first polarization and second polarization, or the fourth precoding matrix is a precoding matrix used to generate first polarization and third polarization; if the first angle of arrival information is greater than or equal to a second threshold and the first angle of arrival information is less than a first threshold, the fourth precoding matrix is a precoding matrix used to generate first polarization, second polarization, and third polarization; or if the first angle of arrival information is less than a second threshold, the fourth precoding matrix is a precoding matrix used to generate second polarization and third polarization.

Optionally, with reference to the fifth aspect or the sixth aspect, the antenna according to the first aspect and the second aspect is deployed in the apparatus.

According to a seventh aspect, a communication apparatus is provided. The communication apparatus is a transmitting end device, a receiving end device, or a device including a chip and the antenna according to the first aspect and the second aspect. The communication apparatus includes a processor, and the processor executes a computer program stored in a memory to implement the method according to any one of the fifth aspect or the sixth aspect.

According to an eighth aspect, a communication apparatus is provided, including a logic circuit and a communication interface. The communication interface is used to send a first reference signal to obtain first indication information, the logic circuit is configured to: determine a second precoding matrix based on the first indication information, and send, through the communication interface, data precoded based on the second precoding matrix, and the logic circuit is configured to implement the method according to any one of the fifth aspect.

According to a ninth aspect, a communication apparatus is provided, including a logic circuit and a communication interface. The communication interface is used to obtain a first reference signal, the logic circuit is configured to: determine first indication information based on the first reference signal, and send the first indication information through the communication interface, and the logic circuit is configured to implement the method according to any one of the sixth aspect.

According to a tenth aspect, a computer program product is provided. When a computer reads and executes the computer program product, the computer is enabled to implement the method according to any one of the fifth aspect or the sixth aspect.

According to an eleventh aspect, a computer-readable storage medium is provided. The computer-readable storage medium stores a computer program, and when the computer program is executed, the method according to any one of the fifth aspect or the sixth aspect is implemented.

According to a twelfth aspect, a communication system is provided, where the communication system includes the foregoing transmitting end device and/or the foregoing receiving end device.

BRIEF DESCRIPTION OF THE DRAWINGS

The following briefly describes accompanying drawings used in descriptions of embodiments or a conventional technology.
Specifically:

FIG. 18 is a schematic diagram of an antenna array according to an embodiment of this application;

DETAILED DESCRIPTION OF ILLUSTRATIVE EMBODIMENTS

Figure 1:
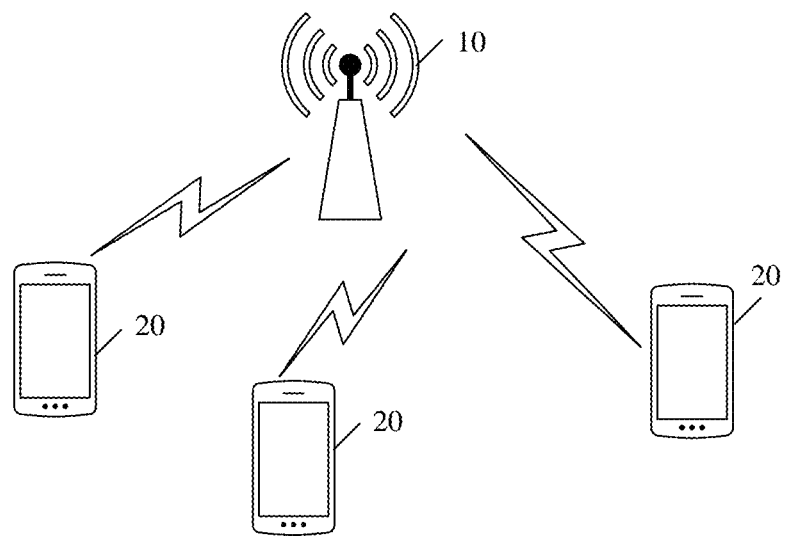
FIG. 1 shows a basic architecture of a communication system according to an embodiment of this application.

The following describes the technical solutions in embodiments of this application with reference to the accompanying drawings in embodiments of this application. The terms "system" and "network" may be used interchangeably in embodiments of this application. "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

In addition, in this application, position terms such as "top" and "bottom" are defined relative to positions of components in the accompanying drawings. It should be understood that these position terms are relative concepts used for relative description and clarification, and may correspondingly change based on changes in the positions of the components in the accompanying drawings.

Reference to "an embodiment", "some embodiments", or the like described in embodiments of this application indicates that one or more embodiments of this application include a specific feature, structure, or characteristic described with reference to embodiments. Therefore, in this specification, statements, such as "in an embodiment", "in some embodiments", "in some other embodiments", and "in other embodiments", that appear at different places do not necessarily mean referring to a same embodiment. Instead, the statements mean referring to "one or more but not all embodiments", unless otherwise specifically emphasized in other ways. Terms "include", "contain", "have", and variants of the terms all mean "include but are not limited to", unless otherwise specifically emphasized in other ways.

The following explains and describes terms used in this application.

In this application, a virtual port is a logical port formed on each antenna element after each antenna element in a single antenna unit in an antenna is weighted by a column of a precoding matrix of antenna elements in the single antenna unit.

For example, if a single antenna unit in an antenna includes three antenna elements, and two virtual ports are formed after being weighted by a precoding matrix of antenna elements in the antenna unit, a virtual port 1 may be a logical port formed on the three antenna elements in the antenna unit after the three antenna elements in the antenna unit are weighted by a first column of the precoding matrix of antenna elements in the antenna unit; and a virtual port 2 may be a logical port formed on the three antenna elements in the antenna unit after the three antenna elements in the antenna unit are weighted by a second column of the precoding matrix of the antenna elements in the antenna unit.

The virtual port may be used to transmit a physical channel or a signal. This is not limited herein.

The foregoing content briefly describes meanings of terms in embodiments of this application. To better understand the technical solutions provided in embodiments of this application, the following describes a system architecture and/or an application scenario in embodiments of this application. It may be understood that scenarios described in embodiments of this application are intended to describe the technical solutions in embodiments of this application more clearly, and do not constitute a limitation on the technical solutions provided in embodiments of this application.

It should be understood that the technical solutions in embodiments of this application may be applied to a long term evolution (LTE) architecture, fifth generation mobile communication technology (5G), satellite communication, and the like. The technical solutions in embodiments of this application may be further applied to another future communication system, for example, a 6G communication system. In the future communication system, a same function may be maintained, but a name may be changed.

The technical solutions provided in this application may be applied to a plurality of scenarios, for example, machine to machine (M2M), macro-micro communication, enhanced mobile broadband (eMBB), ultra reliable and low latency communication (uRLLC), and massive machine type communication (mMTC). These scenarios may include but are not limited to: a scenario of communication between terminal devices, a scenario of communication between network devices, a scenario of communication between a network device and a terminal device, and the like. The technical solutions provided in this application may also be applied to point-to-point communication, for example, fronthaul, midhaul, and backhaul.

It should be understood that an antenna structure provided in this application may be used in a transmitting end device and a receiving end device.

In this application, the transmitting end device may be a device including a chip and an antenna. The chip may include a processor and an interface. This is not limited herein. Further, the transmitting end device is an entity configured to receive a signal, send a signal, or receive a signal and send a signal. For example, the transmitting end device may include a terminal device, a network device, or the like. This is not limited herein.

In this application, the receiving end device may be a device including a chip and an antenna. The receiving end device is an entity configured to receive a signal, send a signal, or receive a signal and send a signal. For example, the receiving end device may include a terminal device, a network device, or the like. This is not limited herein.

An example in which the transmitting end device is a terminal device and the receiving end device is a network device is used below to describe a basic architecture of a communication system provided in embodiments of this application. FIG. 1 shows a basic architecture of a communication system according to an embodiment of this application. As shown in FIG. 1, the communication system may include one or more network devices 10 (only one network device is shown) and one or more terminal devices 20 that communicate with each network device 10. FIG. 1 is merely a schematic diagram, and does not constitute a limitation on an application scenario of the technical solutions provided in this application.

The network device 10 may be an apparatus that is deployed in a radio access network (RAN) and that provides a wireless communication function for the terminal device 20. For example, the network device 10 may be a transmission reception point (TRP), a base station, or control nodes in various forms. The control node is, for example, a network controller, a radio controller, or a radio controller in a cloud radio access network (CRAN) scenario. Specifically, an access network device may be a macro base station, a micro base station (also referred to as a small cell), a relay station, an access point (AP), a radio network controller (RNC), a NodeB (NB), a base station controller (BSC), a base transceiver station (BTS), a home NodeB (for example, a home evolved NodeB, or a home NodeB (HNB), a baseband unit (BBU), a transmission point (TRP), a transmission point (TP), a mobile switching center, and the like, or may be an antenna panel of a base station. The control node may be connected to a plurality of base stations, and configure resources for a plurality of terminals covered by the plurality of base stations. In systems using different radio access technologies, names of devices having functions of the base station may vary. For example, the network device 10 may be an evolved NodeB (evolutional node B, eNB, or eNodeB) in an LTE system, or may be a radio controller in a cloud radio access network (CRAN) scenario, or may be (a new radio NodeB, gNB) in 5G. Alternatively, the network device 10 may be a relay station, an access point, a vehicle-mounted device, a wearable device, a network side device in a network after 5G, a network device in a future evolved PLMN network, or the like. A specific name of the access network device is not limited in this application. The network device 10 may further include a satellite.

The terminal device 20 may be a device that includes a wireless transceiver function and that can cooperate with an access network device to provide a communication service for a user. Specifically, the terminal device 20 may be user equipment (UE), an access terminal, a subscriber unit, a subscriber station, a mobile station, a mobile console, a remote station, a remote terminal, a mobile device, a terminal, radio communication equipment, a user agent, or a user apparatus. Alternatively, the terminal device 20 may be an unmanned aerial vehicle, an Internet of Things (IoT) device, a station (ST) in a WLAN, a cellular phone, a smart phone, a cordless phone, a wireless data card, a tablet computer, a session initiation protocol (session initiation protocol, SIP) phone, a wireless local loop (WLL) station, a personal digital assistant (PDA) device, a laptop computer, a machine type communication (MTC) terminal, a handheld device having a wireless communication function, a computing device or another processing device connected to a wireless modem, a vehicle-mounted device, a wearable device (which may also be referred to as a wearable smart device), a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. Alternatively, the terminal device 20 may be a device-to-device (D2D) device, for example, an electricity meter or a water meter. Alternatively, the terminal device 20 may be a terminal device in a 5G system, or may be a terminal device in a next-generation communication system. This is not limited in this embodiment of this application.

In addition, the technical solutions provided in embodiments of this application are applicable to a plurality of system architectures. A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and emergence of new service scenarios, the technical solutions provided in embodiments of this application are also applicable to similar technical problems.

Optionally, each network element (for example, the network device 10 and the terminal device 20) in FIG. 1 may be implemented by one device, or may be jointly implemented by a plurality of devices, or may be a function module in one device. This is not specifically limited in this embodiment of this application. It may be understood that the foregoing functions may be network elements in a hardware device, or may be software functions running on dedicated hardware, or may be virtualization functions instantiated on a platform (for example, a cloud platform).

Figure 2:
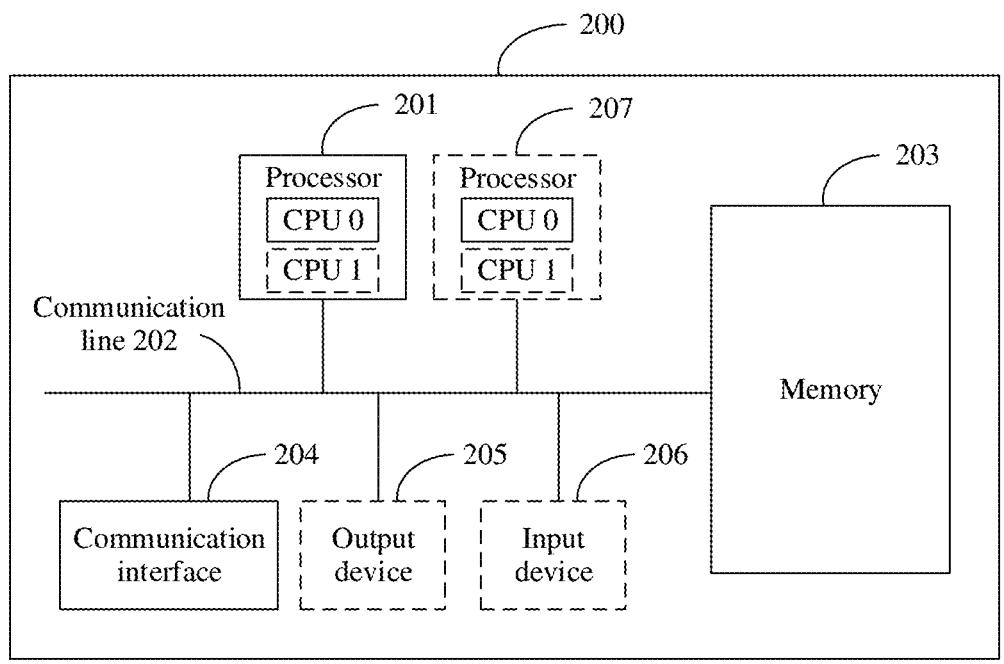
FIG. 2 is a schematic diagram of a hardware structure of a communication apparatus that may be used in an embodiment of this application.

For example, each network element in FIG. 1 may be implemented by a communication apparatus 200 in FIG. 2. FIG. 2 is a schematic diagram of a hardware structure of a communication apparatus that may be used in an embodiment of this application. The communication apparatus 200 includes at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of programs in the solutions in this application.

The communication line 202 may include a path on which information is transferred between the foregoing components.

The communication interface 204 is an apparatus (such as an antenna) such as any transceiver, and is configured to communicate with another device or a communication network, such as the Ethernet, a RAN, or a wireless local area network (WLAN).

The memory 203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile disc, a Blu-ray disc, or the like), magnetic disk storage medium or another magnetic storage device, or any other medium that can be used to carry or store expected program code in a form of instructions or a data structure and that is accessible to a computer, but is not limited thereto. The memory may exist independently, and is connected to the processor through the communication line 202. The memory may alternatively be integrated with the processor. The memory provided in embodiments of this application may be usually non-volatile. The memory 203 is configured to store computer-executable instructions for executing the solutions in this application, and the processor 201 controls the execution. The processor 201 is configured to execute the computer-executable instructions stored in the memory 203, to implement a method provided in the following embodiments of this application.

Optionally, the computer-executable instructions in this embodiment of this application may also be referred to as application program code. This is not specifically limited in this embodiment of this application.

In a possible implementation, the processor 201 may include one or more CPUs, for example, a CPU 0 and a CPU 1 in FIG. 2.

In a possible implementation, the communication apparatus 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In a possible implementation, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

The foregoing communication apparatus 200 may be a general-purpose device or a special-purpose device. During specific implementation, the communication apparatus 200 may be a desktop computer, a portable computer, a network server, a palmtop computer (PDA), a mobile phone, a tablet computer, a wireless terminal device, an embedded device, or a device having a structure similar to that in FIG. 2. A type of the communication apparatus 200 is not limited in this embodiment of this application.

The following describes the technical solutions provided in embodiments of this application with reference to the accompanying drawings.

It should be noted that, in the accompanying drawings of this application, an x-axis direction, a y-axis direction, and a z-axis direction are perpendicular to each other, the z-axis direction is a direction perpendicular to a dielectric plate, and the x-axis direction and the y-axis direction are not limited.

An embodiment of this application provides an antenna. The antenna includes: a dielectric plate provided with a first surface and a second surface; a ground plane located on the first surface; and an antenna unit, where a size of the antenna unit is a preset length, the antenna unit includes at least three antenna elements in a ring arrangement, and each antenna element includes a first patch, a second patch, and a third patch that are located on the second surface, three conductive portions that penetrate through the first surface and the second surface, and a feeding portion connected to the first surface, where a first conductive portion is electrically connected between the feeding portion and the first patch to form a monopole, a second conductive portion is electrically connected between the ground plane and the second patch to form a first parasitic body, a third conductive portion is electrically connected between the ground plane and the third patch to form a second parasitic body, and the first parasitic body and the second parasitic body are located on both sides of the monopole and are configured to isolate adjacent antenna elements in the ring arrangement.

Optionally, there may be one or more dielectric plates. This is not limited herein.

Optionally, if there is one dielectric plate, the first surface and the second surface are disposed opposite to each other, the first surface is a lower surface of the dielectric plate, and the second surface is an upper surface of the dielectric plate.

Figure 3:
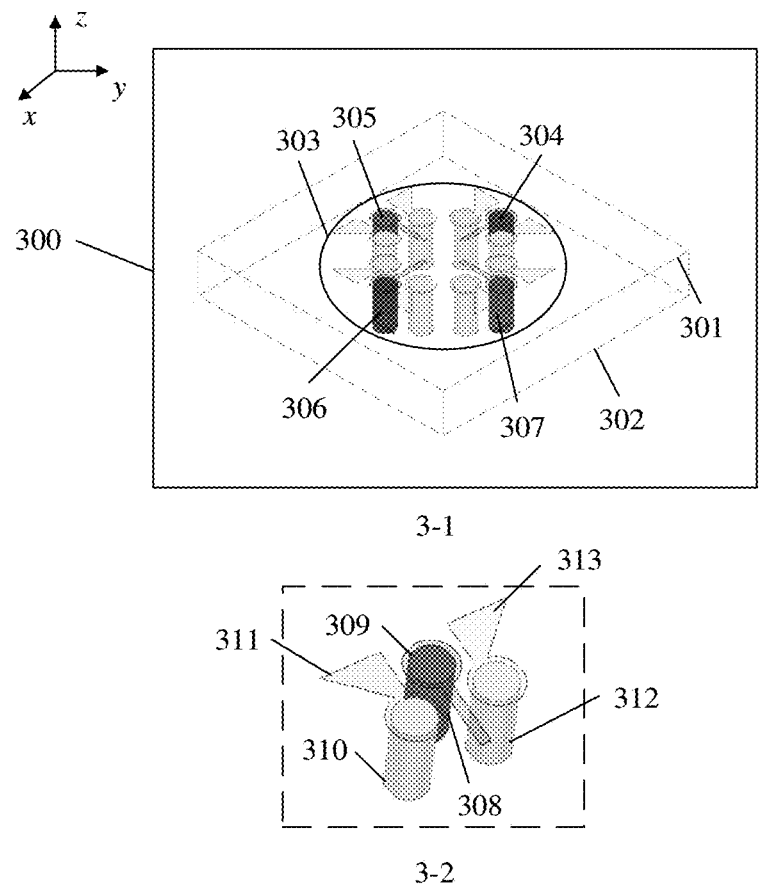
FIG. 3 is a schematic diagram in which patches of antenna elements in an antenna unit are located on a dielectric plate.

For example, FIG. 3 is a schematic diagram in which patches of antenna elements in an antenna unit are located on one dielectric plate. As shown in FIG. 3, in view 3-1, an antenna 300 includes a dielectric plate 301, a ground plane 302, and an antenna unit 303. The dielectric plate 301 is provided with a first surface and a second surface, that is, the dielectric plate 301 is provided with an upper surface and a lower surface. The ground plane 302 is located on the first surface, that is, the ground plane 302 is located on the lower surface of the dielectric plate 301. The antenna unit 303 includes four antenna elements in a ring arrangement, namely, an antenna element 304, an antenna element 305, an antenna element 306, and an antenna element 307.

It should be noted that, in this application, a ring is a surrounding architecture that is connected in a head-to-tail manner, for example, a round ring, a square ring, or a polygon ring. This is not limited herein.

In addition, the antenna element 304, the antenna element 305, the antenna element 306, and the antenna element 307 all include a structure shown in view 3-2. Specifically, the antenna element 304, the antenna element 305, the antenna element 306, and the antenna element 307 each include a first conductive portion 308, a first patch 309, a second conductive portion 310, a second patch 311, a third conductive portion 312, a third patch 313, and a feeding portion (not shown in FIG. 3, where the feeding portion is connected to the first surface, that is, the feeding portion is connected to the lower surface of the dielectric plate 301). The first conductive portion 308 is electrically connected between the feeding portion and the first patch 309 to form a monopole, the second conductive portion 310 is electrically connected between the ground plane 302 and the second patch 311 to form a first parasitic body, and the third conductive portion 312 is electrically connected between the ground plane 302 and the third patch 313 to form a second parasitic body. With reference to 3-1 in FIG. 3, it can be learned that the first parasitic body and the second parasitic body of each of the antenna element 304, the antenna element 305, the antenna element 306, and the antenna element 307 are located on both sides of the monopole. In addition, the first patch, the second patch, and the third patch of each of the antenna element 304, the antenna element 305, the antenna element 306, and the antenna element 307 are all located on the second surface of the dielectric plate 301, that is, the first patch, the second patch, and the third patch of each of the antenna element 304, the antenna element 305, the antenna element 306, and the antenna element 307 are all located on the upper surface of the dielectric plate 301.

It should be noted that, in this application, the antennas provided in FIG. 3 and FIG. 5 to FIG. 11 are shown to include four antenna elements. However, it should be understood that the antennas may include any other quantity of antenna elements. In an implementation, the quantity of antenna elements is greater than or equal to 3. This is not limited herein.

Figure 4:
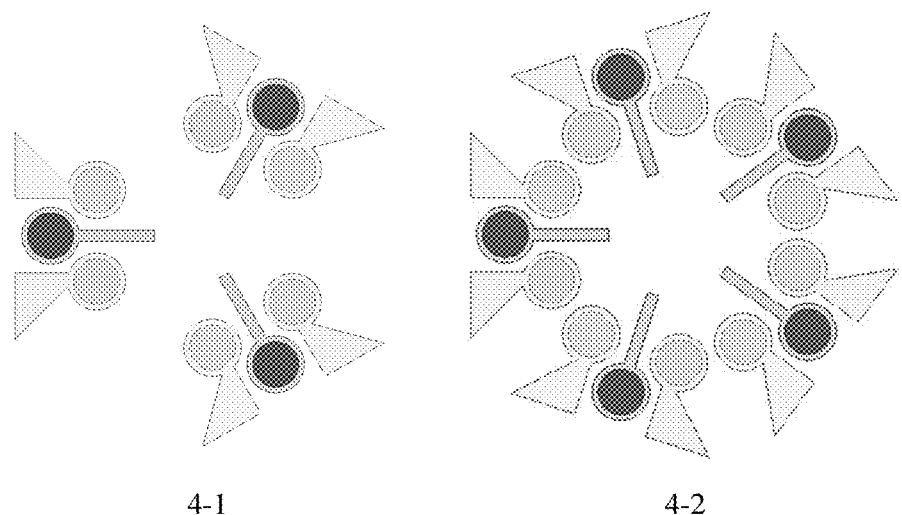
FIG. 4 is a schematic diagram of antenna units including different quantities of antenna elements.

For example, FIG. 4 is a schematic diagram in which antenna units include different quantities of antenna elements. As shown in FIG. 4, in 4-1, an antenna unit includes three antenna elements; and in 4-2, an antenna unit includes five antenna elements.

Optionally, if there may be a plurality of dielectric plates, the plurality of dielectric plates are sequentially stacked from top to bottom, and each of the plurality of dielectric plates includes two opposite surfaces. A first surface is a first surface of a dielectric plate that is in the plurality of dielectric plates and on which a ground plane is disposed, that is, the first surface is a lower surface of the dielectric plate that is in the plurality of dielectric plates and on which the ground plane is disposed. There may be one or more second surfaces. For example, the second surface may be a second surface of any one of the plurality of dielectric plates, or the second surface may include second surfaces of at least two of the plurality of dielectric plates. That is, the second surface may be an upper surface of any one of the plurality of dielectric plates, or the second surface may include upper surfaces of at least two of the plurality of dielectric plates.

For example, the plurality of dielectric plates include a first dielectric plate and a second dielectric plate that are sequentially stacked from top to bottom, where the first dielectric plate and the second dielectric plate each include opposite surfaces. The ground plane is located on a first surface of the second dielectric plate, that is, the first surface is a lower surface of the second dielectric plate. The second surface may be a second surface of the first dielectric plate, or the second surface may be a second surface of the second dielectric plate, or the second surface may include a second surface of the first dielectric plate and a second surface of the second dielectric plate. That is, the second surface may be an upper surface of the first dielectric plate, or the second surface may be an upper surface of the second dielectric plate, or the second surface may include an upper surface of the first dielectric plate and an upper surface of the second dielectric plate.

Optionally, if there are a plurality of dielectric plates, the plurality of dielectric plates include a first dielectric plate and a second dielectric plate that are sequentially stacked from top to bottom. A first patch, a second patch, and a third patch of a first antenna element are located on a second surface of the first dielectric plate, that is, the first patch, the second patch, and the third patch of the first antenna element are located on an upper surface of the first dielectric plate. A first conductive portion, a second conductive portion, and a third conductive portion of the first antenna element penetrate through the second surface of the first dielectric plate, a first surface of the first dielectric plate, a second surface of the second dielectric plate, and a first surface of the second dielectric plate. A first patch, a second patch, and a third patch of a second antenna element are located on the second surface of the second dielectric plate, that is, the first patch, the second patch, and the third patch of the second antenna element are located on an upper surface of the second dielectric plate. A first conductive portion, a second conductive portion, and a third conductive portion of the second antenna element penetrate through the second surface of the second dielectric plate and the first surface of the second dielectric plate. A first patch of a third antenna element is located on the second surface of the first dielectric plate, and a second patch and a third patch of the third antenna element are located on the second surface of the second dielectric plate. That is, the first patch of the third antenna element is located on the upper surface of the first dielectric plate, and the second patch and the third patch of the third antenna element are located on the upper surface of the second dielectric plate. A first conductive portion of the third antenna element penetrates through the second surface of the first dielectric plate, the first surface of the first dielectric plate, the second surface of the second dielectric plate, and the first surface of the second dielectric plate, and a second conductive portion and a third conductive portion of the third antenna element penetrate through the second surface of the second dielectric plate and the first surface of the second dielectric plate. A first patch of a fourth antenna element is located on the second surface of the second dielectric plate, and a second patch and a third patch of the fourth antenna element are located on the second surface of the first dielectric plate. That is, the first patch of the fourth antenna element is located on the upper surface of the second dielectric plate, and the second patch and the third patch of the fourth antenna element are located on the upper surface of the first dielectric plate. A first conductive portion of the fourth antenna element penetrates through the second surface of the second dielectric plate and the first surface of the second dielectric plate, and a second conductive portion and a third conductive portion of the fourth antenna element penetrate through the second surface of the first dielectric plate, the first surface of the first dielectric plate, the second surface of the second dielectric plate, and the first surface of the second dielectric plate. The at least three antenna elements may include one or more of the following: the first antenna element, the second antenna element, the third antenna element, and the fourth antenna element. This is not limited herein. In addition, in this application, a first patch, a second patch, and a third patch of a specific antenna element are located on a second surface of a specific dielectric plate. This is not limited herein.

Figure 5:
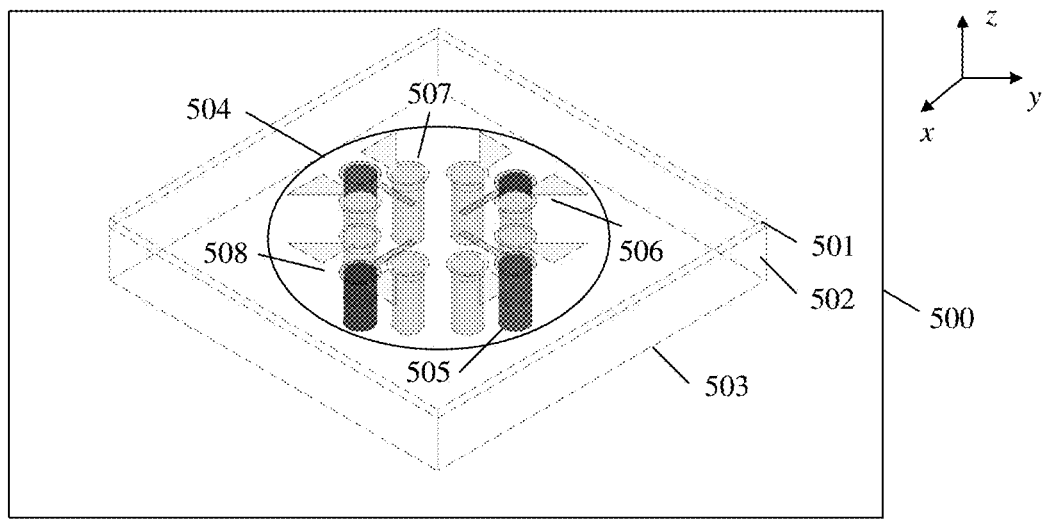
FIG. 5 is a schematic diagram in which patches of antenna elements in an antenna unit are located on different dielectric plates.

For example, FIG. 5 is a schematic diagram in which patches of antenna elements in an antenna unit are located on different dielectric plates. As shown in FIG. 5, an antenna 500 includes a dielectric plate 501 and a dielectric plate 502 that are sequentially stacked from top to bottom. The dielectric plate 501 and the dielectric plate 502 each include opposite surfaces, that is, the dielectric plate 501 is provided with a first surface and a second surface. That is, the dielectric plate 501 is provided with an upper surface and a lower surface. The dielectric plate 502 is provided with a first surface and a second surface, that is, the dielectric plate 502 is provided with an upper surface and a lower surface. The antenna 500 further includes a ground plane 503 and an antenna unit 504. The ground plane 503 is located on the first surface of the dielectric plate 502, that is, the ground plane 503 is located on the lower surface of the dielectric plate 502. The antenna unit 504 includes four antenna elements, namely, an antenna element 505, an antenna element 506, an antenna element 507, and an antenna element 508. For structures included in the antenna element 505, the antenna element 506, the antenna element 507, and the antenna element 508, refer to the structures included in the antenna elements of the antenna unit 303 in FIG. 3, and details are not described herein again. Certainly, in FIG. 5, a feeding portion is connected to the first surface of the dielectric plate 502, that is, the feeding portion is connected to the lower surface of the dielectric plate 502. Further, a first patch, a second patch, and a third patch of the antenna element 505 are located on the second surface of the dielectric plate 501, that is, the first patch, the second patch, and the third patch of the antenna element 505 are located on the upper surface of the dielectric plate 501. A first patch of the antenna element 506 is located on the second surface of the dielectric plate 502, and a second patch and a third patch of the antenna element 506 are located on the second surface of the dielectric plate 501. That is, the first patch of the antenna element 506 is located on the upper surface of the dielectric plate 502, and the second patch and the third patch of the antenna element 506 are located on the upper surface of the dielectric plate 501. A first patch, a second patch, and a third patch of the antenna element 507 are located on the second surface of the dielectric plate 501, that is, the first patch, the second patch, and the third patch of the antenna element 507 are located on the upper surface of the dielectric plate 501. A first patch of the antenna element 508 is located on the second surface of the dielectric plate 502, and a second patch and a third patch of the antenna element 508 are located on the second surface of the dielectric plate 501. That is, the first patch of the antenna element 508 is located on the upper surface of the dielectric plate 502, and the second patch and the third patch of the antenna element 508 are located on the upper surface of the dielectric plate 501. In addition, a first conductive portion, a second conductive portion, and a third conductive portion of the antenna element 505 penetrate through the second surface of the dielectric plate 501, the first surface of the dielectric plate 501, the second surface of the dielectric plate 502, and the first surface of the dielectric plate 502. A first conductive portion of the antenna element 506 penetrates through the second surface of the dielectric plate 502 and the first surface of the dielectric plate 502, and a second conductive portion and a third conductive portion of the antenna element 506 penetrate through the second surface of the dielectric plate 501, the first surface of the dielectric plate 501, the second surface of the dielectric plate 502, and the first surface of the dielectric plate 502. A first conductive portion, a second conductive portion, and a third conductive portion of the antenna element 507 penetrate through the second surface of the dielectric plate 501, the first surface of the dielectric plate 501, the second surface of the dielectric plate 502, and the first surface of the dielectric plate 502. A first conductive portion of the antenna element 508 penetrates through the second surface of the dielectric plate 502 and the first surface of the dielectric plate 502, and a second conductive portion and a third conductive portion of the antenna element 508 penetrate through the second surface of the dielectric plate 501, the first surface of the dielectric plate 501, the second surface of the dielectric plate 502, and the first surface of the dielectric plate 502.

Optionally, the dielectric plate is a printed circuit board or a ceramic dielectric plate. This is not limited herein.

Optionally, the ground plane may be a ground plane made of a conductive material, for example, a metal ground plane.

Optionally, a preset length is close to or equal to half a wavelength. This is not limited herein.

Optionally, a material of a conductive portion may be at least one of a metal, a conductive adhesive, or a conductive foam with good conductivity. Specifically, when a metal material is selected, a combination of one or more of copper, iron, aluminum, steel, aluminum alloy, and nickel-copper alloy may be selected. It should be noted that, if the conductive portion is made of at least two of the metal materials, the at least two metal materials may be combined by using a process such as splicing, welding, and rolling. In addition, when the material of the conductive portion is a metal, different structures may be used. For example, the conductive portion may be a metal spring of a sheet structure, or may be a metal conducting wire of a line body structure, or may be a metal screw of a rod structure, or may be a metal hole. If the conductive portion is a metal conducting wire of a line body structure, for example, the conductive portion may be a transmission line such as a strip line, a microstrip line, or a coplanar waveguide. If the conductive portion is a metal hole, a shape of the conductive portion may be, for example, a cylinder, a triangular column, a cuboid, a pentagonal column, or another shape. This is not limited herein. Second, on the basis that performance of the metal hole is not affected, the metal hole may also be filled with another material such as resin. In addition, a size of the metal hole may be adjusted based on a process and antenna performance. This is not limited herein.

Optionally, materials of the first patch, the second patch, and the third patch are metal with good conductivity. For example, the first patch, the second patch, and the third patch are all metal patches.

Optionally, shapes of the first patch, the second patch, and the third patch are not limited in this application. For example, a shape of the first patch may be a rectangle, a gradient tie shape, or the like, and shapes of the second patch and the third patch may be a rectangle, a triangle, a sector, or the like.

Figure 6:
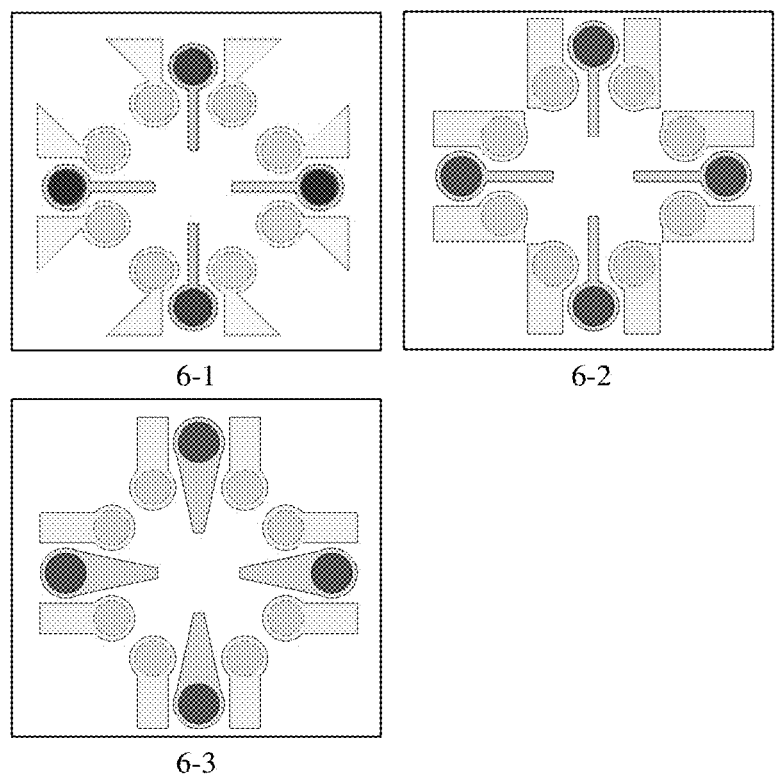
FIG. 6 is a schematic diagram of patches of antenna elements in an antenna unit.

For example, FIG. 6 is a schematic diagram of patches of antenna elements in an antenna unit. As shown in FIG. 6, in structure 6-1, a parasitic patch in each antenna element is in a triangle shape, and a monopole patch in each antenna element is in a rectangle shape; in structure 6-2, a parasitic patch in each antenna element is in a rectangle shape, and a monopole patch in each antenna element is in a rectangle shape; in structure, a parasitic patch in each antenna element is in a rectangle shape, and a monopole patch in each antenna element is in a gradient tie shape.

Optionally, sizes of the first patch, the second patch, and the third patch are not limited in this application.

Optionally, the monopole may be, for example, an L-type monopole. This is not limited herein.

Optionally, the feeding portion is configured to feed the monopole. For example, the feeding portion is configured to transfer an excitation signal to the first patch through the first conductive portion, and the first patch is configured to radiate the excitation signal. The feeding portion may be, for example, a feeding port or a feeding circuit. This is not limited herein.

It can be learned that, in the foregoing technical solution, at least three antenna elements in a ring arrangement are used, and a first parasitic body and a second parasitic body are located on both sides of a monopole, and are configured to isolate adjacent antenna elements in the ring arrangement. In this way, when a size of an antenna unit is a preset length, three types of polarized beams are generated by using a planar structure, so that a MIMO capacity is greatly improved, and a space diversity capacity is high. In addition, it is avoided that a three-dimensional structure needs to be used in an existing solution to implement generation of three types of polarized beams, so that a requirement on processing technologies is reduced, and the antenna is applicable to both a high frequency and a low frequency. In addition, by using different quantities of dielectric plates, in different cases, three types of polarized beams can still be generated by using a planar structure in a case in which a size of an antenna unit is a preset length, so that a MIMO capacity is improved greatly, and a space diversity capacity is high.

Optionally, either of the first parasitic body and the second parasitic body is located between monopoles of the adjacent antenna elements in the at least three antenna elements.

For example, with reference to FIG. 5, it can be learned that the antenna element 505 is adjacent to the antenna element 506, and the antenna element 505 is adjacent to the antenna element 508. In a possible implementation, a first parasitic body of the antenna element 505 is located between a monopole of the antenna element 505 and a monopole of the antenna element 506, and a second parasitic body of the antenna element 505 is located between the monopole of the antenna element 505 and a monopole of the antenna element 508. In still another possible implementation, the second parasitic body of the antenna element 505 is located between the monopole of the antenna element 505 and the monopole of the antenna element 506, and the first parasitic body of the antenna element 505 is located between the monopole of the antenna element 505 and the monopole of the antenna element 508. In other words, in this application, the first parasitic body and the second parasitic body of each antenna element are specifically located between monopoles of two specific adjacent antenna elements. This is not limited herein. In addition, for another antenna element except the antenna element 505, for which any parasitic body of a first parasitic body and a second parasitic body is specifically located between monopoles of two specific adjacent antenna elements, refer to the first parasitic body and the second parasitic body of the antenna element 505. Details are not described herein again.

It can be learned that, in the foregoing technical solution, isolation of adjacent antenna elements is implemented.

Optionally, the first patch, the second patch, and the third patch of at least one of the at least three antenna elements are electrically connected, or there are gaps among the first patch, the second patch, and the third patch of at least one of the at least three antenna elements.

Optionally, the first patch, the second patch, and the third patch of at least one of the at least three antenna elements are electrically connected, and there is a gap between the second patch of the at least one of the at least three antenna elements and a third patch of an adjacent antenna element.

It should be noted that, in this application, a first parasitic body corresponding to the second patch of the at least one antenna element is adjacent to a second parasitic body corresponding to the third patch of the adjacent antenna element. For example, the at least three antenna elements include, for example, the first antenna element and the second antenna element, where the first antenna element is adjacent to the second antenna element. The first patch, the second patch, and the third patch of the first antenna element are electrically connected, and the first patch, the second patch, and the third patch of the second antenna element are electrically connected. If a first parasitic body of the first antenna element is adjacent to a second parasitic body of the second antenna element, there is a gap between the second patch of the first parasitic body of the first antenna element and the third patch of the second parasitic body of the second antenna element.

Figure 7:
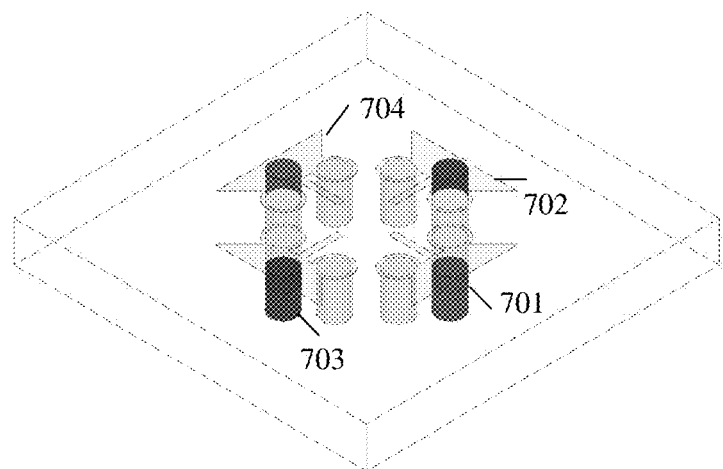
FIG. 7 is a schematic diagram of electrical connections of all patches of antenna elements in an antenna unit.

For example, FIG. 7 is a schematic diagram of electrical connections of all patches of antenna elements in an antenna unit. As shown in FIG. 7, a first patch, a second patch, and a third patch of each of an antenna element 701, an antenna element 702, an antenna element 703, and an antenna element 704 are electrically connected. The antenna element 701 is separately adjacent to the antenna element 702 and the antenna element 703, and the antenna element 704 is separately adjacent to the antenna element 702 and the antenna element 703. With reference to FIG. 7, it can be learned that there is a gap between a patch of a parasitic body of the antenna element 701 and a patch of a parasitic body of the antenna element 702; there is a gap between the patch of the parasitic body of the antenna element 701 and a patch of a parasitic body of the antenna element 703; there is a gap between a patch of a parasitic body of the antenna element 704 and the patch of the parasitic body of the antenna element 702; and there is a gap between the patch of the parasitic body of the antenna element 704 and the patch of the parasitic body of the antenna element 703.

It may be learned that, in the foregoing technical solution, a first patch, a second patch, and a third patch of at least one of at least three antenna elements are electrically connected, and there is a gap between the second patch of the at least one of the at least three antenna elements and a third patch of an adjacent antenna element, so that an electromagnetic wave radiation area is increased, thereby improving an antenna gain. In addition, isolation between adjacent antenna elements is improved.

Optionally, there are gaps among the first patch, the second patch, and the third patch of at least one of the at least three antenna elements, and there is a gap or an electrical connection between the second patch of the at least one of the at least three antenna elements and the third patch of the adjacent antenna element. This is not limited herein.

Figure 8:
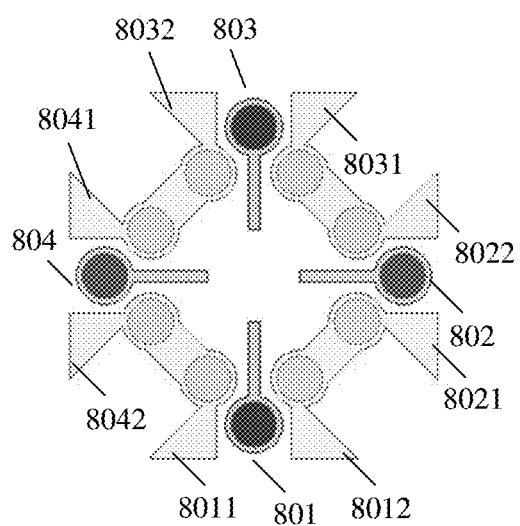
FIG. 8 is a schematic diagram of electrical connections of patches of parasitic bodies in an antenna unit.

For example, FIG. 8 is a schematic diagram of electrical connections of patches of parasitic bodies in an antenna unit. As shown in FIG. 8, an antenna element 801 is separately adjacent to an antenna element 802 and an antenna element 804, and an antenna element 803 is separately adjacent to the antenna element 802 and the antenna element 804. It can be learned that there are gaps among a first patch, a second patch, and a third patch of each of the antenna element 801, the antenna element 802, the antenna element 803, and the antenna element 804. A second patch 8011 of the antenna element 801 and a third patch 8042 of the antenna element 804 are electrically connected, and a third patch 8012 of the antenna element 801 and a second patch 8021 of the antenna element 802 are electrically connected. A third patch 8022 of the antenna element 802 and a second patch 8031 of the antenna element 803 are electrically connected, and a third patch 8032 of the antenna element 803 and a second patch 8041 of the antenna element 804 are electrically connected.

For example, with reference to FIG. 5, it can be learned that there are gaps among the first patch, the second patch, and the third patch of each antenna element in the antenna unit 504. In addition, there is a gap between the second patch of each antenna element in the antenna unit 504 and a third patch of an adjacent antenna element.

It can be learned that, in the foregoing technical solution, there are gaps among a first patch, a second patch, and a third patch of at least one of at least three antenna elements. Because capacitance effect is introduced by gaps among patches of a single antenna element, the capacitance effect is offset by inductance effect of conductive portions, thereby improving a matching bandwidth of the antenna elements. In addition, there is a gap between the second patch of the at least one of the at least three antenna elements and a third patch of an adjacent antenna element, thereby improving isolation of adjacent antenna elements. The second patch of the at least one of the at least three antenna elements is electrically connected to the third patch of the adjacent antenna element, thereby reducing process complexity caused by a gap. And, for a single antenna element, an electromagnetic wave radiation area is increased, thereby improving an antenna gain.

Optionally, there is a gap between the second patch of the at least one of the at least three antenna elements and the third patch of the adjacent antenna element, and there are gaps or electrical connections among the first patch, the second patch, and the third patch of at least one of the at least three antenna elements.

For example, the at least three antenna elements include, for example, a first antenna element and a second antenna element, where the first antenna element is adjacent to the second antenna element. If a first parasitic body of the first antenna element is adjacent to a second parasitic body of the second antenna element, and there is a gap between a second patch of the first antenna element and a third patch of the second antenna element, there are gaps or electrical connections among a first patch, the second patch, and a third patch of the first antenna element, and there are gaps or electrical connections among a first patch, a second patch, and the third patch of the second antenna element.

It can be learned that, in the foregoing technical solution, there is a gap between a second patch of at least one of at least three antenna elements and a third patch of an adjacent antenna element, thereby improving isolation of adjacent antenna elements. The second patch of the at least one of the at least three antenna elements is electrically connected to the third patch of the adjacent antenna element, thereby reducing process complexity caused by a gap. And, for a single antenna element, an electromagnetic wave radiation area is increased, thereby improving an antenna gain. In addition, there are gaps among a first patch, the second patch, and a third patch of at least one of the at least three antenna elements. Because capacitance effect is introduced by gaps among patches of the single antenna element, the capacitance effect is offset by inductance effect of conductive portions, thereby improving a matching bandwidth of the antenna elements. There is a gap between the second patch of the at least one of the at least three antenna elements and the third patch of the adjacent antenna element, thereby improving isolation of the adjacent antenna elements.

Optionally, the second patch of the at least one of the at least three antenna elements and the third patch of the adjacent antenna element are electrically connected to at least two conductive portions, and the at least two conductive portions are electrically connected to a ground plane. In this case, there are gaps among the first patch, the second patch, and the third patch of at least one of the at least three antenna elements.

Figure 9:
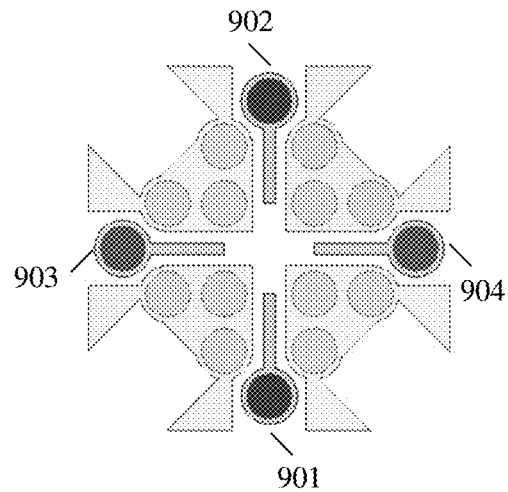
FIG. 9 is a schematic diagram in which patches of parasitic bodies of adjacent antenna elements in an antenna unit are electrically connected to at least two conductive portions.

For example, FIG. 9 is a schematic diagram in which patches of parasitic bodies of adjacent antenna elements in an antenna unit are electrically connected to at least two conductive portions. As shown in FIG. 9, an antenna element 901 is separately adjacent to an antenna element 903 and an antenna element 904, and an antenna element 902 is separately adjacent to the antenna element 903 and the antenna element 904. Patches of parasitic bodies of the antenna element 901 and the antenna element 903 are electrically connected to three conductive portions, and the three conductive portions are electrically connected to the ground plane. Patches of parasitic bodies of the antenna element 901 and the antenna element 904 are electrically connected to three conductive portions, and the three conductive portions are electrically connected to the ground plane. Patches of parasitic bodies of the antenna element 902 and the antenna element 903 are electrically connected to three conductive portions, and the three conductive portions are electrically connected to the ground plane. Patches of parasitic bodies of the antenna element 902 and the antenna element 904 are electrically connected to three conductive portions, and the three conductive portions are electrically connected to the ground plane. In addition, with reference to FIG. 9, it can be learned that there are gaps among a first patch, a second patch, and a third patch of the antenna element 901, there are gaps among a first patch, a second patch, and a third patch of the antenna element 902, there are gaps among a first patch, a second patch, and a third patch of the antenna element 903, and there are gaps among a first patch, a second patch, and a third patch of the antenna element 904.

It can be learned that, in the foregoing technical solution, a second patch of at least one of at least three antenna elements and a third patch of an adjacent antenna element are electrically connected to at least two conductive portions, thereby improving isolation of adjacent antenna elements, improving impedance matching, and improving an antenna gain.

Optionally, a conductive portion corresponding to the second patch of the at least one of the at least three antenna elements is a conductive portion corresponding to the third patch of the adjacent antenna element. In this case, the second patch of the at least one of the at least three antenna elements and the third patch of the adjacent antenna element are electrically connected, and there are gaps among a first patch, the second patch, and a third patch of at least one of the at least three antenna elements.

Figure 10:
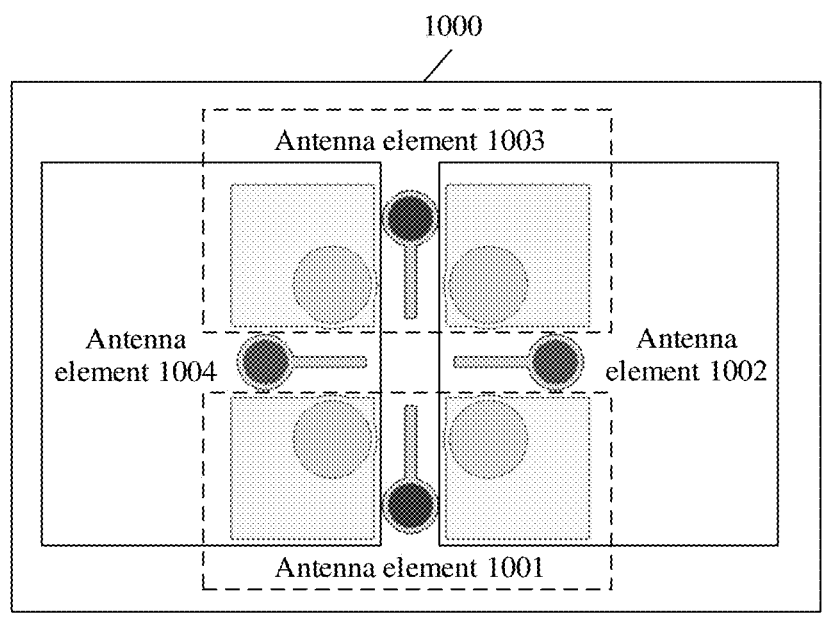
FIG. 10 is a schematic diagram of only one parasitic body existing between adjacent antenna elements in an antenna unit.

For example, FIG. 10 is a schematic diagram of only one parasitic body existing between adjacent antenna elements in an antenna unit. As shown in FIG. 10, an antenna unit 1000 includes four antenna elements, namely, an antenna element 1001, an antenna element 1002, an antenna element 1003, and an antenna element 1004. With reference to FIG. 10, it can be learned that there is only one parasitic body between two adjacent antenna elements, and the parasitic body between the two adjacent antenna elements is located between monopoles of the two adjacent antenna elements.

It can be learned that, in the foregoing technical solution, a conductive portion corresponding to a second patch of at least one of at least three antenna elements is a conductive portion corresponding to a third patch of an adjacent antenna element, thereby reducing a quantity of conductive portions, and reducing complexity of a structure and a process.

Optionally, an antenna provided in embodiments of this application may be further applicable to a low frequency. In this case, the antenna may not include a dielectric plate.

The following describes beneficial effects that can be implemented in the foregoing embodiments with reference to simulation data.

Figure 11:
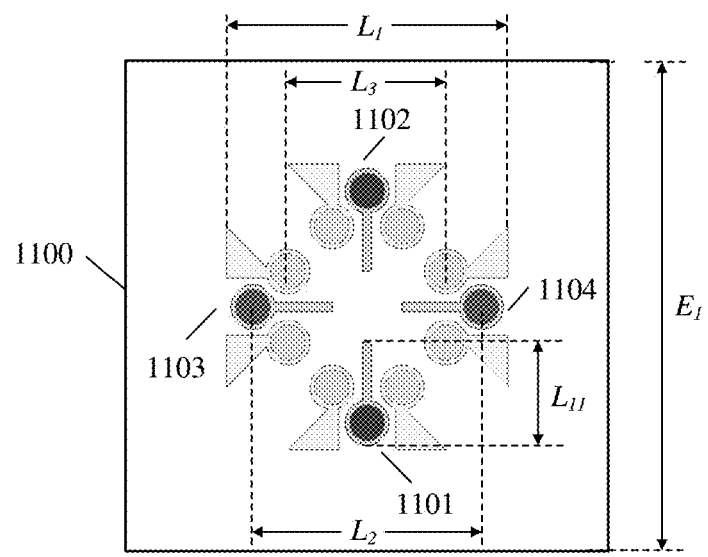
FIG. 11 is a schematic diagram of a structure of an antenna unit according to an embodiment of this application.

For example, FIG. 11 is a schematic diagram of a structure of an antenna unit according to an embodiment of this application. As shown in FIG. 11, an antenna unit 1100 includes four antenna elements, namely, an antenna element 1101, an antenna element 1102, an antenna element 1103, and an antenna element 1104. The antenna element 1101 is separately adjacent to the antenna element 1103 and the antenna element 1104. The antenna element 1102 is separately adjacent to the antenna element 1103 and the antenna element 1104. The antenna element 1101 and the antenna element 1102 are two opposite antenna elements, and the antenna element 1103 and the antenna element 1104 are two opposite antenna elements. Each of the antenna element 1101, the antenna element 1102, the antenna element 1103, and the antenna element 1104 includes one monopole and two parasitic bodies. A shape of a patch of the monopole is a rectangle, and a shape of a patch of the parasitic body is a triangle. With reference to FIG. 11, it can be learned that conductive portions of the monopole and the parasitic body are metal holes, and a shape of a dielectric plate is a square.

Figure 12:
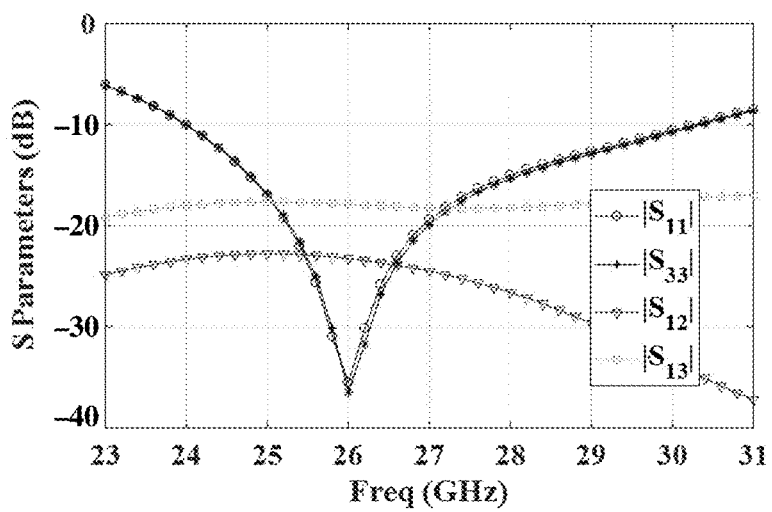
FIG. 12 shows a full-wave simulation result of an antenna unit 1100 in FIG. 11.
Figure 13:
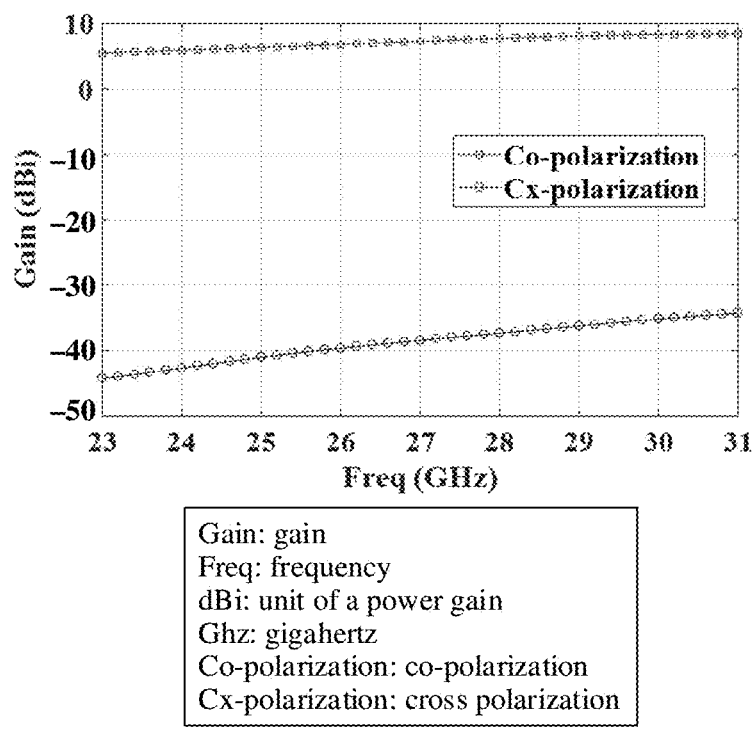
FIG. 13 is a schematic diagram of a gain curve that varies with a frequency when an antenna unit 1100 in FIG. 11 is fed.

It is assumed that a dielectric constant of the dielectric plate is 2.2, and a loss tangent (loss tangent) is 0.0009. A size E1 of the dielectric plate is 11 mm, and a height H of the dielectric plate is 1.774 mm. Parameters of the antenna unit include: $L_1$=6.42 mm, $L_2$=5.2 mm, $L_3$=3.6 mm, $L_4$=2.3 mm, and a radius of the metal hole is 0.4 mm. Further, when full-wave simulation of the antenna unit 1000 is implemented by using lumped port feeding, a full-wave simulation result of the four antenna elements may be obtained. Because the four antenna elements are in a ring arrangement, reflection coefficient curves of the four antenna elements overlap. An isolation curve between the antenna element 1101 and the antenna element 1103 overlaps an isolation curve between the antenna element 1101 and the antenna element 1104, an isolation curve between the antenna element 1102 and the antenna element 1103 overlaps an isolation curve between the antenna element 1102 and the antenna element 1104, and an isolation curve between the antenna element 1101 and the antenna element 1102 overlaps an isolation curve between the antenna element 1103 and the antenna element 1104. Specifically, FIG. 12 shows a full-wave simulation result of the antenna unit 1100 in FIG. 11. For brevity, FIG. 12 shows only two reflection coefficient curves and two isolation curves. As shown in FIG. 12, |S11| is, for example, a reflection coefficient curve of the antenna element 1101, |S33| is, for example, a reflection coefficient curve of the antenna element 1103, |S12| is, for example, an S parameter curve reflecting isolation between the antenna element 1101 and the antenna element 1102, and | S13| is, for example, an S parameter curve reflecting isolation between the antenna element 1101 and the antenna element 1103. |S11| and |S33| overlap. Further, a matching bandwidth for |S11|≤−10 dB is 22.9%, and covers 24 GHz to 30.2 GHz. Therefore, the antenna unit 1100 may fully cover 26 GHz and 28 GHz frequency bands of a 5G NR millimeter wave. In addition, with reference to |S13|, it can be learned that isolation between adjacent antenna elements is greater than 17.5 dB; and with reference to |S12|, it can be learned that isolation between opposite antenna elements is greater than 22 dB. In addition, a coordinate system identifier of the antenna structure is shown in FIG. 3. Only the antenna element 1101 and the antenna element 1102 are fed, and the antenna element 1103 and the antenna element 1104 are not fed. In addition, excitation signals of the antenna element 1101 and the antenna element 1102 have a same amplitude and a phase difference of 180°. In this case, the antenna unit 1100 radiates an x-polarization beam, and a gain curve of the x-polarization beam that varies with a frequency is shown in FIG. 13. FIG. 13 is a schematic diagram of the gain curve that varies with the frequency when the antenna unit 1100 in FIG. 11 is fed. With reference to FIG. 13, it can be learned that an antenna radiation gain at 28 GHz is 7.8 dBi, and compared with a co-polarization level, a cross-polarization level is less than −40 dB.

Figure 14:
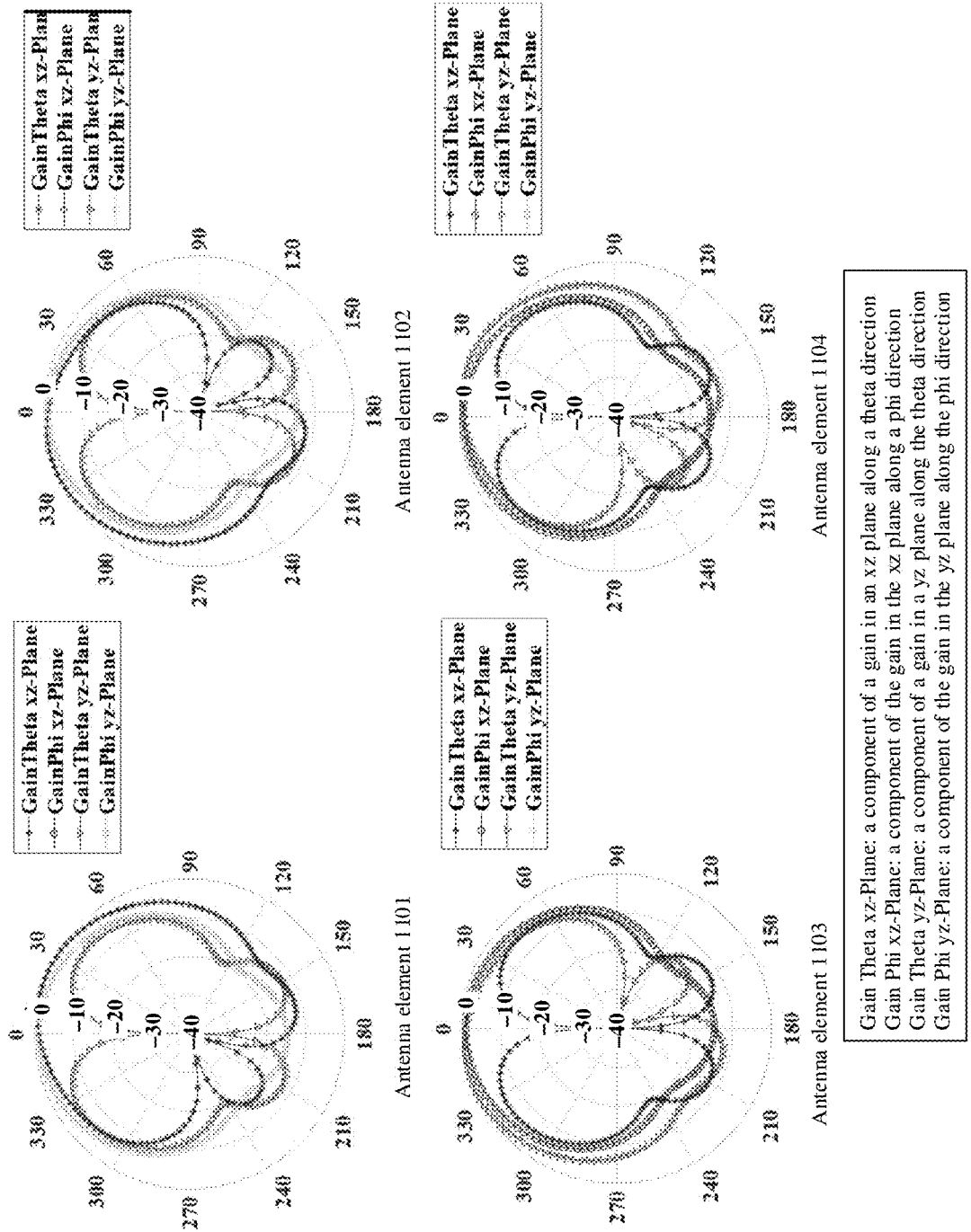
FIG. 14 is radiation patterns corresponding to antenna elements of an antenna unit 1100 in FIG. 11.

Optionally, when one of the four antenna elements is fed, a maximum value of a radiation pattern corresponding to each antenna element is along an axial direction. Specifically, FIG. 14 is radiation patterns corresponding to antenna elements of the antenna unit 1100 in FIG. 11. As shown in FIG. 14, a radiation pattern corresponding to each antenna element includes a component of a gain in an xz plane along a theta direction (Gain Theta x-Plane), a component of a gain in a yz plane along the theta direction (Gain Theta yz-Plane), a component of the gain in the xz plane along a phi direction (Gain Phi xz-Plane), and a component of the gain in the yz plane along the phi direction (Gain Phi yz-Plane), where theta and phi respectively represent an included angle and an azimuth between an electric field vector and a positive direction of a z-axis in a spherical coordinate system. A radiation pattern of the antenna element 1101 is separately different from co-polarization directions of radiation patterns of the antenna element 1103 and the antenna element 1104, and a radiation pattern of the antenna element 1102 is separately different from the co-polarization directions of the radiation patterns of the antenna element 1103 and the antenna element 1104. Because the antenna element 1101 and the antenna element 1102 are two opposite antenna elements, directions of maximum values of main lobes of the antenna element 1101 and the antenna element 1102 have an angular deviation from the z-axis. Similarly, directions of maximum values of main lobes of the antenna element 1103 and the antenna element 1104 also have an angular deviation from the z-axis. In addition, correlations between the four antenna elements may be represented by an envelope correlation coefficient (ECC). In the matching bandwidth, an ECC value between every two antenna elements is less than 0.01, which indicates that a correlation between each antenna element is very small, and also indicates that the antenna unit 1100 may be used in a MIMO scenario to improve spectral efficiency.

Figure 15:
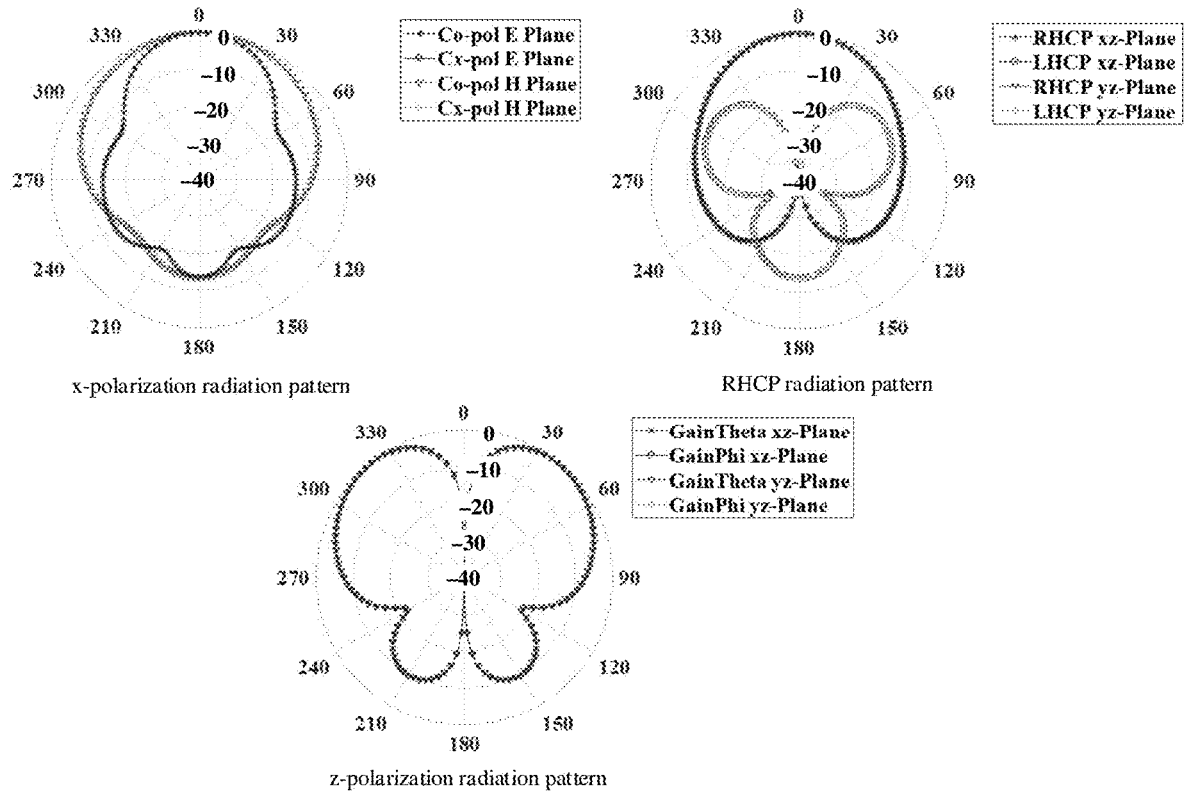
FIG. 15 is radiation patterns corresponding to an antenna unit 1100 in FIG. 11 when excitation signals are different.

Optionally, the antenna unit 1100 may be configured to implement an omnidirectional and directional multi-polarization beam by changing excitation signals that are input from feeding portions to antenna elements. For example, FIG. 15 is radiation patterns corresponding to an antenna unit 1100 in FIG. 11 when excitation signals are different. As shown in FIG. 15, when excitation signals are different, the antenna unit 1100 may implement x polarization (x-pol), right hand circular polarization (RHCP), and z polarization (z-pol), namely, an x-polarization radiation pattern, an RHCP radiation pattern, and a z-polarization radiation pattern.

Optionally, if amplitudes and phases of the excitation signals that are input from the feeding portions to the antenna elements are the same, the antenna unit 1100 radiates a z-polarization (z-pol) omnidirectional beam. As shown in a state 1 in Table 1, excitation signals of the four antenna elements have a same amplitude and a phase of 0°, and the antenna unit 1100 radiates a z-polarization omnidirectional beam. As shown in FIG. 15, a z-polarization radiation pattern is in a conical (Conical) spiral direction.

Optionally, if opposite antenna elements are fed, and excitation signals of the opposite antenna elements have a same amplitude and a phase difference of 180°, main directions of the radiation patterns of the antenna unit 1100 are all oriented towards the z axis, which is referred to as a radiation broadside direction. In a state 2 shown in Table 1, when the excitation signals of the antenna element 1101 and the antenna element 1102 have a same amplitude and a phase difference of 180°, excitation signals of the antenna element 1103 and the antenna element 1104 have a same amplitude and a phase difference of 180°, excitation signals of the antenna element 1101 and the antenna element 1104 have a same amplitude and a phase difference of 90°, and excitation signals of the antenna element 1102 and the antenna element 1103 have a same amplitude and a phase difference of 90°, the antenna unit 1100 radiates an LHCP beam.

Optionally, when the four antenna elements are fed, if excitation signals of every two groups of opposite antenna elements have a same amplitude and a phase difference of 90 degrees, the antenna unit 1100 may radiate an LHCP beam or an RHCP beam. As shown in a state 3 in Table 1, excitation signals of the antenna element 1101 and the antenna element 1103 have a same amplitude and a phase difference of 90 degrees, excitation signals of the antenna element 1102 and the antenna element 1104 have a same amplitude and a phase difference of 90 degrees, and the antenna unit 1100 radiates an RHCP beam. The RHCP radiation pattern in FIG. 15 is in a broadside direction.

Optionally, when opposite antenna elements are fed, if excitation signals of the opposite antenna elements have a same amplitude and a phase difference of another angle except 90° and 180°, or amplitudes of the excitation signals are different, the antenna unit 1100 may radiate an elliptically polarized beam.

Optionally, if only the opposite antenna elements are fed, the antenna unit 1100 may radiate an x-polarization beam or a y-polarization (y-pol) beam. As shown in a state 4 and a state 5 in Table 1, for the state 4 in Table 1, it can be learned that, only the antenna element 1101 and the antenna element 1102 are fed, and the antenna element 1103 and the antenna element 1104 are not fed. In addition, the excitation signals of the antenna element 1101 and the antenna element 1102 have a same amplitude and a phase difference of 180°. In this case, the antenna unit 1100 radiates an x-polarization beam, and a radiation pattern is in a broadside direction. For the state 5 in Table 1, it can be learned that, only the antenna element 1103 and the antenna element 1104 are fed, and the antenna element 1101 and the antenna element 1102 are not fed. In addition, the excitation signals of the antenna element 1103 and the antenna element 1104 have a same amplitude and a phase difference of 180°. In this case, the antenna unit 1100 radiates a y-polarization beam, and a radiation pattern is in a broadside direction.

Optionally, if opposite antenna elements in the four antenna elements are all excited, the antenna unit 1100 may radiate a ±45° polarized beam. It can be seen from a state 6 and a state 7 in Table 1 that, the excitation signals of the antenna element 1101 and the antenna element 1102 have a same amplitude and a phase difference of 180°, and the excitation signals of the antenna element 1103 and the antenna element 1104 have a same amplitude and a phase difference of 180°. In this case, the antenna unit 1100 radiates a ±45° polarized beam, and a radiation pattern is a broadside direction.

Optionally, the four antenna elements are divided into two groups, each group includes two antenna elements, and the two antenna elements are opposite to each other. If amplitudes and phases of the two groups of excitation signals are different, the antenna unit 1100 may radiate a beam in any elliptical polarization direction in an xy plane. For example, a first group of excitation signals and a second group of excitation signals have different amplitudes and phases. In this case, the antenna unit 1100 may radiate a beam in any elliptical polarization direction in the xy plane. In addition, for the first group, the excitation signals of the antenna element 1101 and the antenna element 1102 have a same amplitude, a same phase, or different phases; and for the second group, the excitation signals of the antenna element 1103 and the antenna element 1104 have a same amplitude, a same phase, or different phases. This is not limited herein.

TABLE 1

Radiation pattern and excitation signals

| | Excitation signals input from feeding portions to antenna elements | | | | | |
|---|---|---|---|---|---|---|
| State | Antenna element 1101 | Antenna element 1102 | Antenna element 1103 | Antenna element 1104 | | Radiation pattern |
| 1 | 1∠0° | 1∠0° | 1∠0° | 1∠0° | z-pol | Conical |
| 2 | 1∠0° | 1∠180° | 1∠270° | 1∠90° | LHCP | Broadside |
| 3 | 1∠0° | 1∠180° | 1∠90° | 1∠270° | RHCP | Broadside |
| 4 | 1∠0° | 1∠180° | o | o | x-pol | Broadside |
| 5 | o | o | 1∠0° | 1∠180° | y-pol | Broadside |
| 6 | 1∠0° | 1∠180° | 1∠0° | 1∠180° | 45°-pol | Broadside |
| 7 | 1∠0° | 1∠180° | 1∠180° | 1∠0° | −45°-pol | Broadside |

Optionally, with reference to Table 1, z polarization in the state 1 is orthogonal to other polarization in the state 2 to the state 7. An LHCP in the state 2 and an RHCP in the state 3 are mutually orthogonal polarization pairs, an x polarization in the state 4 and a y polarization in the state 5 are mutually orthogonal polarization pairs, a 45° polarization in the state 6 and a −45° polarization in the state 7 are mutually orthogonal polarization pairs, and each polarization pair is not orthogonal to the other polarization pair. Therefore, the antenna unit 1100 may implement beams in three polarization states in total, which is specifically shown in FIG. 15. Details are not described herein again.

With reference to FIG. 11 to FIG. 15, it can be learned that, in this solution, when a size of a plane of an antenna is close to or equal to half a wavelength, three types of polarized beams are generated by using a plane structure, so that a MIMO capacity is greatly improved, and a space diversity capacity is high. In addition, it is avoided that a three-dimensional structure needs to be used in an existing solution to implement generation of three types of polarized beams, so that a requirement on processing technologies is reduced, and the antenna is applicable to both a high frequency and a low frequency.

Optionally, the ring arrangement includes a first ring arrangement and a second ring arrangement, and the first ring arrangement is obtained by rotating the second ring arrangement by a preset angle at a geometric center of the antenna. The preset angle may be any angle between 0 and 360°. This is not limited in this application.

An embodiment of this application further provides an antenna array. The antenna array includes a plurality of antennas provided in embodiments of this application, and a ring arrangement of a first antenna is the same as or different from a ring arrangement of a second antenna.

Optionally, the ring arrangement of the first antenna is the same as the ring arrangement of the second antenna. That is, the ring arrangement of the first antenna is a first ring arrangement, and the ring arrangement of the second antenna is the first ring arrangement; or the ring arrangement of the first antenna is a second ring arrangement, and the ring arrangement of the second antenna is the second ring arrangement.

Optionally, the ring arrangement of the first antenna is different from the ring arrangement of the second antenna. That is, the ring arrangement of the first antenna is the first ring arrangement, and the ring arrangement of the second antenna is the second ring arrangement; or the ring arrangement of the first antenna is the second ring arrangement, and the ring arrangement of the second antenna is the first ring arrangement.

Figure 16:
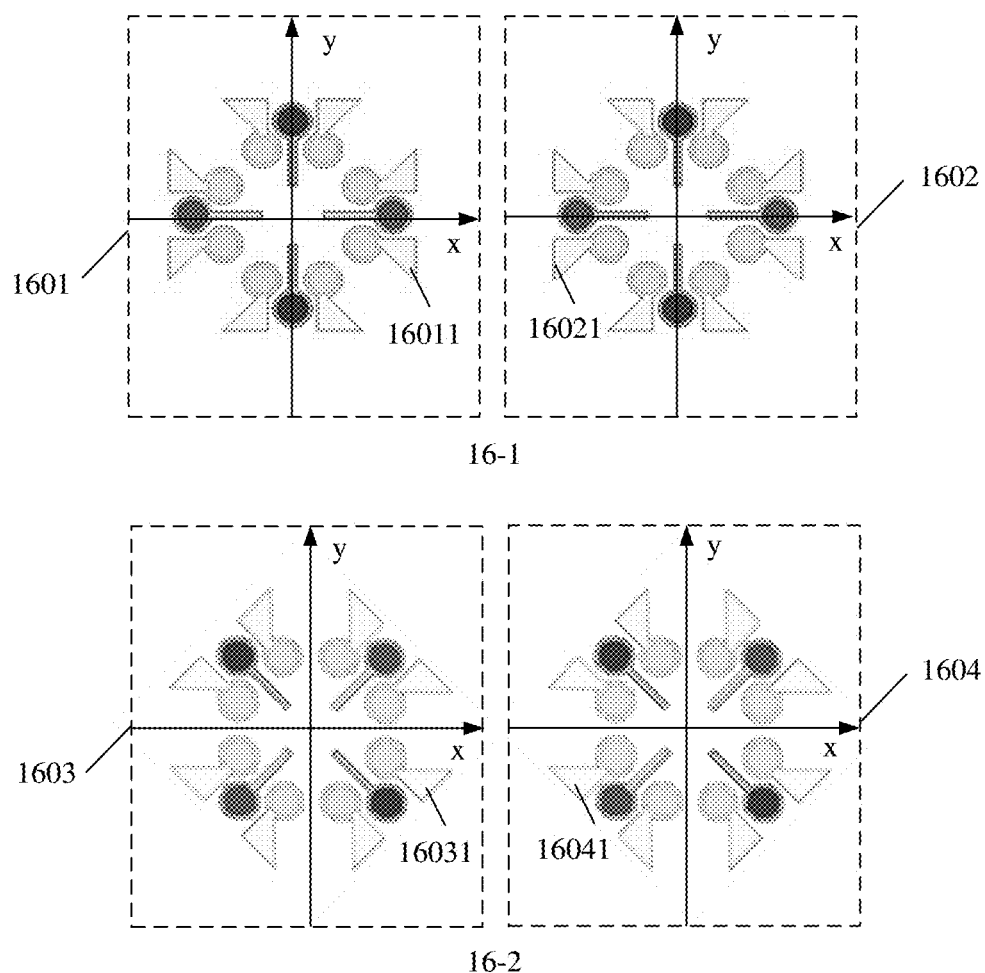
FIG. 16 is a schematic diagram of a ring arrangement according to an embodiment of this application.

For example, FIG. 16 is a schematic diagram of a ring arrangement according to an embodiment of this application. As shown in FIG. 16, an antenna array in structure 16-1 includes an antenna 1601 and an antenna 1602. A coordinate system is established by using a geometric center of the antenna 1601 as an origin point. In the coordinate system, an x-axis and a y-axis are perpendicular to each other, a positive direction of the x-axis is a horizontal rightward direction, and a positive direction of the y-axis is an upward direction. With reference to FIG. 16, it can be learned that two antenna elements are arranged in the antenna 1601 in an x-axis direction, and two antenna elements are arranged in the antenna 1601 in a y-axis direction. A coordinate system is established by using a geometric center of the antenna 1602 as an origin point. In the coordinate system, an x-axis and a y-axis are perpendicular to each other, a positive direction of the x-axis is a horizontal rightward direction, and a positive direction of the y-axis is an upward direction. With reference to FIG. 16, it can be learned that two antenna elements are arranged in the antenna 1602 in an x-axis direction, and two antenna elements are arranged in the antenna 1602 in a y-axis direction. Therefore, a ring arrangement of the antennas 1601 is the same as a ring arrangement of the antennas 1602. An antenna array in structure 16-2 includes an antenna 1603 and an antenna 1604. A coordinate system is established by using a geometric center of the antenna 1603 as an origin point. In the coordinate system, an x-axis and a y-axis are perpendicular to each other, a positive direction of the x-axis is a horizontal rightward direction, and a positive direction of the y-axis is an upward direction. With reference to FIG. 16, it can be learned that four antenna elements in the antenna 1603 are symmetrically arranged in the x-axis direction. A coordinate system is established by using a geometric center of the antenna 1604 as an origin point. In the coordinate system, an x-axis and a y-axis are perpendicular to each other, a positive direction of the x-axis is a horizontal rightward direction, and a positive direction of the y-axis is an upward direction. With reference to FIG. 16, it can be learned that four antenna elements in the antenna 1604 are symmetrically arranged in the x-axis direction. Therefore, a ring arrangement of the antennas 1603 is the same as a ring arrangement of the antennas 1604.

Figure 17:
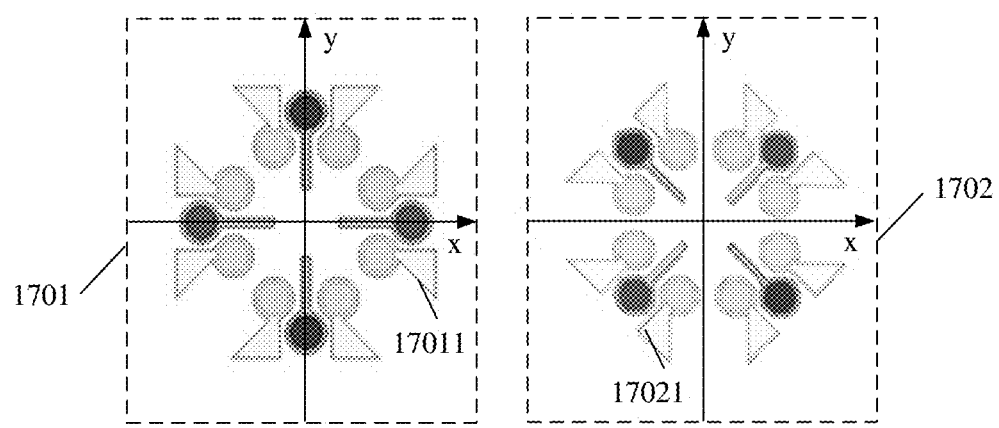
FIG. 17 is a schematic diagram of still another ring arrangement according to an embodiment of this application.

For example, FIG. 17 is a schematic diagram of still another ring arrangement according to an embodiment of this application. As shown in FIG. 17, a coordinate system is established by using a geometric center of an antenna 1701 as an origin point. In the coordinate system, an x-axis and a y-axis are perpendicular to each other, a positive direction of the x-axis is a horizontal rightward direction, and a positive direction of the y-axis is an upward direction. A coordinate system is established by using a geometric center of an antenna 1702 as an origin point. In the coordinate system, an x-axis and a y-axis are perpendicular to each other, a positive direction of the x-axis is a horizontal rightward direction, and a positive direction of the y-axis is an upward direction. Two antenna elements are arranged in the antenna 1701 in an x-axis direction, and two antenna elements are arranged in the antenna 1701 in a y-axis direction. Four antenna elements in the antenna 1702 are symmetrically arranged in the x-axis direction. In addition, with reference to FIG. 17, it can be learned that a ring arrangement of the antenna 1701 is obtained by rotating a ring arrangement of the antenna 1702 by 45 degrees at a geometric center of the antenna 1702. Therefore, the ring arrangement of the antennas 1701 is different from the ring arrangement of the antennas 1702.

With reference to Table 2, simulation results of FIG. 16 and FIG. 17 are described. In structure 16-1 of FIG. 16, an antenna element 16011 and an antenna element 16021 are closest to each other among antenna elements in the antenna 1601 and antenna elements in the antenna 1602. Isolation between the antenna element 16011 and the antenna element 16021 is 8 dB, that is, minimum isolation between the antenna 1601 and the antenna 1602 is 8 dB. In structure 16-2 of FIG. 16, an antenna element 16031 and an antenna element 16041 are closest to each other among antenna elements in the antenna 1603 and antenna elements in the antenna 1604. Isolation between the antenna element 16031 and the antenna element 16041 is greater than 14 dB, that is, isolation between the antenna 1603 and the antenna 1604 is greater than 14 dB. In FIG. 17, an antenna element 17011 and an antenna element 17021 are closest to each other among antenna elements in the antenna 1701 and antenna elements in the antenna 1702. Isolation between the antenna element 17011 and the antenna element 17021 is greater than 14 dB, that is, isolation between the antenna 1701 and the antenna 1702 is greater than 14 dB.

TABLE 2

Isolation corresponding to different ring arrangement in the antenna array

| | | Isolation |
|---|---|---|
| Antenna 1601 | Antenna 1602 | 8 dB |
| Antenna 1603 | Antenna 1604 | Greater than 14 dB |
| Antenna 1701 | Antenna 1702 | Greater than 14 dB |

Optionally, in this application, a first ring arrangement may be, for example, the ring arrangement of the antenna 1701, and a second ring arrangement may be, for example, the ring arrangement of the antenna 1702. This is not limited herein.

Optionally, some coupling suppression structures, such as an electromagnetic bandgap structure, a defected ground structure, a wave-absorbing structure, and the like, may be added between adjacent antennas in the antenna array. Alternatively, a super surface is added above the antenna array to improve isolation between antennas.

Optionally, an arrangement manner of the antenna array may be a sparse arrangement, a lattice array, a radiation array, a spiral array, or an asymmetric form of antenna arrays of a transmitting end device and a receiving end device. This is not limited herein.

For example, FIG. 18 is a schematic diagram of an antenna array according to an embodiment of this application. As shown in FIG. 18, both an antenna of a transmitting end device and an antenna of a receiving end device are a uniform circular array (UCA) formed by a plurality of antenna units in a circular arrangement. By using different excitation manners in Table 1, a circular array may also implement three different polarization manners. In this case, each antenna unit may be equivalent to three half-wave dipole antennas that are vertically arranged, so as to improve wireless communication by using a polarization dimension of an electromagnetic field.

It can be learned that, in the foregoing technical solution, isolation of adjacent antennas is improved by using different ring arrangements.

Figure 19:
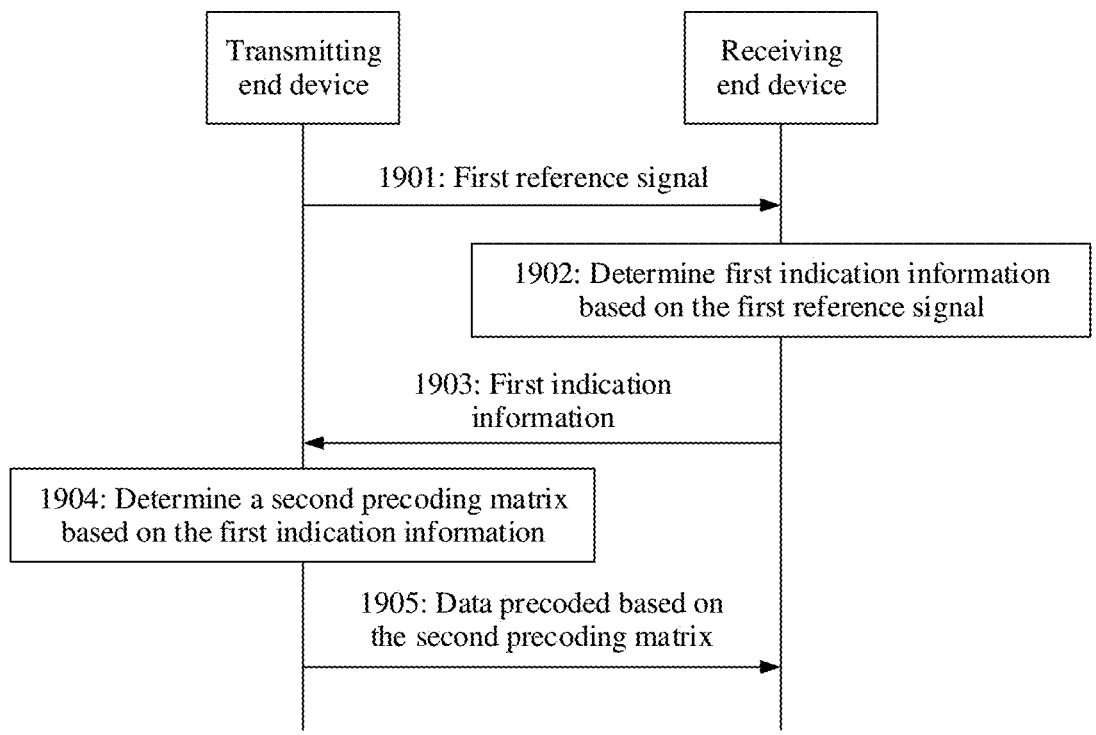
FIG. 19 is a schematic flowchart of a channel state information transmission method according to an embodiment of this application.

The following describes a channel state information transmission method provided in an embodiment of this application. FIG. 19 is a schematic flowchart of a channel state information transmission method according to an embodiment of this application. As shown in FIG. 19, the method includes but is not limited to the following steps.

1901: A transmitting end device sends a first reference signal, and correspondingly, a receiving end device receives the first reference signal.

Optionally, that a transmitting end device sends a first reference signal includes: The transmitting end device sends a second reference signal on a first virtual port of the transmitting end device; the transmitting end device receives a third reference signal sent by the receiving end device to the transmitting end device on a first virtual port of the receiving end device, where the first virtual port of the receiving end device is determined based on first angle of arrival information, and the first angle of arrival information is determined by the receiving end device based on the second reference signal; the transmitting end device determines second angle of arrival information based on the third reference signal; and the transmitting end device sends the first reference signal to the receiving end device on a second virtual port of the transmitting end device based on the second angle of arrival information.

Optionally, in this application, the first reference signal, the second reference signal, and the third reference signal may include one of the following: a synchronization signal block (SSB), a channel state reference signal (CSI-RS), a sounding reference signal (SRS), and the like.

Optionally, there is one or more first virtual ports of the transmitting end device. This is not limited herein. For example, to determine channel state information more conveniently and efficiently, there may be two first virtual ports of the transmitting end device.

For example, the first virtual port of the transmitting end device is a logical port formed on four antenna elements deployed in any antenna unit of an antenna of the transmitting end device after the four antenna elements are weighted by a precoding matrix of antenna elements in the antenna unit in Table 3, Table 4, Table 5, Table 6, Table 7, Table 8, Table 9, or Table 10. For example, the first virtual port of the transmitting end device may be a logical port formed after the four antenna elements are weighted by $$\frac{1}{2}\begin{bmatrix}1\\1\\1\\1\end{bmatrix},$$

and a beam radiated by the first virtual port of the transmitting end device is a z-polarization conical spiral beam.

With reference to Table 3, Table 4, Table 5, or Table 6, it can be learned that one index corresponds to one precoding matrix of antenna elements in the antenna unit. In Table 3, 0 corresponds to $$\frac{1}{2}\begin{bmatrix}1\\1\\1\\1\end{bmatrix},$$

1 corresponds to $$\frac{1}{2}\begin{bmatrix}1\\1\\-1\\-1\end{bmatrix},$$

and the like. Precoding matrices of antenna elements in the antenna unit corresponding to the remaining indexes may be shown in Table 3, and are not repeated herein. In Table 3, Table 4, Table 5, or Table 6, 1 is used to indicate an excitation signal whose amplitude is 1 and phase is 0°, −1 is used to indicate an excitation signal whose amplitude is 1 and phase is 180°, and 0 is used to indicate an excitation signal whose amplitude is 0.

Optionally, the precoding matrix of the antenna elements in the antenna unit in Table 3 includes a precoding matrix used to generate a single virtual port, and a beam radiated by the single virtual port includes a beam of first polarization, second polarization, or third polarization. The first polarization is z polarization, the second polarization is x polarization, and the third polarization is y polarization. The precoding matrix of the antenna elements in the antenna unit in Table 4 includes a precoding matrix used to generate two virtual ports, and beams radiated by the two virtual ports include beams of the first polarization and the second polarization, or beams of the first polarization and the third polarization. The precoding matrix of the antenna elements in the antenna unit in Table 5 is a precoding matrix used to generate a single virtual port, and a beam radiated by the single virtual port includes a beam of the second polarization or the third polarization. The precoding matrix of the antenna elements in the antenna unit in Table 6 is a precoding matrix used to generate two virtual ports, and beams radiated by the two virtual ports includes a beam of the second polarization and the third polarization.

Optionally, matrices in both Table 3 and Table 5 are matrices with four rows and one column, where 4 is a quantity of antenna elements in the antenna unit, and 1 is a quantity of virtual ports in the antenna unit. Optionally, matrices in both Table 4 and Table 6 are matrices with four rows and two columns, where 4 is a quantity of antenna elements in the antenna unit, and 2 is a quantity of virtual ports in the antenna unit.

With reference to Table 7, Table 8, Table 9, or Table 10, it can be learned that one index corresponds to one precoding matrix of antenna elements in the antenna unit. In Table 7, 0 corresponds to $$\frac{1}{2}\begin{bmatrix}1\\0\\0\\0\end{bmatrix},$$

1 corresponds to $$\frac{1}{2}\begin{bmatrix}0\\1\\0\\0\end{bmatrix},$$

and the like. Precoding matrices of antenna elements in the antenna unit corresponding to the remaining indexes may be shown in Table 7, and are not repeated herein. In Table 7, Table 8, Table 9, or Table 10, 1 is used to indicate an excitation signal whose amplitude is 1 and phase is 0°, −1 is used to indicate an excitation signal whose amplitude is 1 and phase is 180°, 0 is used to indicate an excitation signal whose amplitude is 0, j is used to indicate an excitation signal whose amplitude is 1 and phase is 90°, and −j is used to indicate an excitation signal whose amplitude is 1 and phase is −90°.

Optionally, the precoding matrix of the antenna elements in the antenna unit in Table 7, Table 8, Table 9, and Table 10 includes a precoding matrix used to generate the first polarization, the second polarization, and the third polarization, or a precoding matrix used to generate other polarization or another radiation pattern except the first polarization, the second polarization, and the third polarization.

For example, in Table 9, $$\frac{1}{2\sqrt{3}}\begin{bmatrix}1 & 1 & 1\\1 & -1 & -1\\1 & 1 & -1\\1 & -1 & 1\end{bmatrix}$$

is a precoding matrix used to generate z polarization, 45° polarization, and −45° polarization.

Optionally, matrices in Table 7 are matrices with four rows and one column, where 4 is a quantity of antenna elements in the antenna unit, and 1 is a quantity of virtual ports in the antenna unit. Matrices in Table 8 are matrices with four rows and two columns, where 4 is a quantity of antenna elements in the antenna unit, and 2 is a quantity of virtual ports in the antenna unit. Matrices in Table 9 are matrices with four rows and three columns, where 4 is a quantity of antenna elements in the antenna unit, and 3 is a quantity of virtual ports in the antenna unit. Matrices in Table 10 are matrices with four rows and four columns, where 4 is a quantity of antenna elements in the antenna unit, and 4 is a quantity of virtual ports in the antenna unit.

TABLE 3

Mapping relationship between an index and a precoding matrix of antenna elements in the antenna unit

| Index (index) | Precoding matrix of the antenna elements in the antenna unit |
|---|---|
| 0 | $\frac{1}{2}\begin{bmatrix}1\\1\\1\\1\end{bmatrix}$ |

TABLE 3-continued

Mapping relationship between an index and a precoding matrix of antenna elements in the antenna unit

| Index (index) | Precoding matrix of the antenna elements in the antenna unit |
|---|---|
| 1 | $\dfrac{1}{2}\begin{bmatrix}1\\1\\-1\\-1\end{bmatrix}$ |
| 2 | $\dfrac{1}{2}\begin{bmatrix}1\\-1\\0\\0\end{bmatrix}$ |
| 3 | $\dfrac{1}{2}\begin{bmatrix}0\\0\\1\\-1\end{bmatrix}$ |

TABLE 4

Mapping relationship between an index and a precoding matrix of antenna elements in the antenna unit

| Index (index) | Precoding matrix of the antenna elements in the antenna unit |
|---|---|
| 0 | $\dfrac{1}{2\sqrt{2}}\begin{bmatrix}1 & 1\\1 & 1\\1 & -1\\1 & -1\end{bmatrix}$ |
| 1 | $\dfrac{1}{2\sqrt{2}}\begin{bmatrix}1 & 1\\1 & -1\\1 & 0\\1 & 0\end{bmatrix}$ |
| 2 | $\dfrac{1}{2\sqrt{2}}\begin{bmatrix}1 & 0\\1 & 0\\1 & 1\\1 & -1\end{bmatrix}$ |

TABLE 5

Mapping relationship between an index and a precoding matrix of antenna elements in the antenna unit

| Index (index) | Precoding matrix of the antenna elements in the antenna unit |
|---|---|
| 0 | $\dfrac{1}{2}\begin{bmatrix}0\\-1\\0\\0\end{bmatrix}$ |
| 1 | $\dfrac{1}{2}\begin{bmatrix}0\\0\\1\\-1\end{bmatrix}$ |
| 2 | $\dfrac{1}{2}\begin{bmatrix}1\\-1\\1\\-1\end{bmatrix}$ |

TABLE 5-continued

Mapping relationship between an index and a precoding matrix of antenna elements in the antenna unit

| Index (index) | Precoding matrix of the antenna elements in the antenna unit |
|---|---|
| 3 | $\dfrac{1}{2}\begin{bmatrix}1\\-1\\-1\\1\end{bmatrix}$ |
| 4 | $\dfrac{1}{2}\begin{bmatrix}1\\-1\\j\\-j\end{bmatrix}$ |
| 5 | $\dfrac{1}{2}\begin{bmatrix}1\\-1\\-j\\j\end{bmatrix}$ |

TABLE 6

Mapping relationship between an index and a precoding matrix of antenna elements in the antenna unit

| Index (index) | Precoding matrix of the antenna elements in the antenna unit |
|---|---|
| 0 | $\dfrac{1}{2}\begin{bmatrix}1 & 0\\-1 & 0\\0 & 1\\0 & -1\end{bmatrix}$ |
| 1 | $\dfrac{1}{2}\begin{bmatrix}1 & 1\\-1 & -1\\1 & -1\\-1 & 1\end{bmatrix}$ |
| 2 | $\dfrac{1}{2}\begin{bmatrix}1 & 1\\-1 & -1\\j & -j\\-j & j\end{bmatrix}$ |

TABLE 7

Mapping relationship between an index and a precoding matrix of antenna elements in the antenna unit

| Index (index) | Precoding matrix of the antenna elements in the antenna unit |
|---|---|
| 0 | $\dfrac{1}{2}\begin{bmatrix}1\\0\\0\\0\end{bmatrix}$ |
| 1 | $\dfrac{1}{2}\begin{bmatrix}0\\1\\0\\0\end{bmatrix}$ |
| 2 | $\dfrac{1}{2}\begin{bmatrix}0\\0\\1\\0\end{bmatrix}$ |

TABLE 7-continued

Mapping relationship between an index and a precoding matrix of antenna elements in the antenna unit

| Index (index) | Precoding matrix of the antenna elements in the antenna unit |
|---|---|
| 3 | $\frac{1}{2}\begin{bmatrix} 0 \\ 0 \\ 0 \\ 1 \end{bmatrix}$ |

TABLE 8

Mapping relationship between an index and a precoding matrix of antenna elements in the antenna unit

| Index (index) | Precoding matrix of the antenna elements in the antenna unit |
|---|---|
| 0 | $\frac{1}{2}\begin{bmatrix} 1 & 0 \\ 0 & 1 \\ 0 & 0 \\ 0 & 0 \end{bmatrix}$ |
| 1 | $\frac{1}{2}\begin{bmatrix} 1 & 0 \\ 0 & 0 \\ 0 & 1 \\ 0 & 0 \end{bmatrix}$ |
| 2 | $\frac{1}{2}\begin{bmatrix} 1 & 0 \\ 0 & 0 \\ 0 & 0 \\ 0 & 1 \end{bmatrix}$ |
| 3 | $\frac{1}{2}\begin{bmatrix} 0 & 0 \\ 1 & 0 \\ 0 & 1 \\ 0 & 0 \end{bmatrix}$ |
| 4 | $\frac{1}{2}\begin{bmatrix} 0 & 0 \\ 0 & 0 \\ 1 & 0 \\ 0 & 1 \end{bmatrix}$ |

TABLE 9

Mapping relationship between an index and a precoding matrix of antenna elements in the antenna unit

| Index (index) | Precoding matrix of the antenna elements in the antenna unit |
|---|---|
| 0 | $\frac{1}{2}\begin{bmatrix} 1 & 0 & 0 \\ 0 & 1 & 0 \\ 0 & 0 & 1 \\ 0 & 0 & 0 \end{bmatrix}$ |
| 1 | $\frac{1}{2\sqrt{2}}\begin{bmatrix} 1 & 1 & 0 \\ 1 & -1 & 0 \\ 1 & 0 & 1 \\ 1 & 0 & -1 \end{bmatrix}$ |
| 2 | $\frac{1}{2\sqrt{3}}\begin{bmatrix} 1 & 1 & 1 \\ 1 & -1 & -1 \\ 1 & 1 & -1 \\ 1 & -1 & 1 \end{bmatrix}$ |
| 3 | $\frac{1}{2\sqrt{3}}\begin{bmatrix} 1 & 1 & 1 \\ 1 & -1 & -1 \\ 1 & j & -j \\ 1 & -j & j \end{bmatrix}$ |

TABLE 10

Mapping relationship between an index and a precoding matrix of antenna elements in the antenna unit

| Index (index) | Precoding matrix of the antenna elements in the antenna unit |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 1 | $\frac{1}{4}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 2 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ |
| 3 | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ |

Optionally, there is one or more second virtual ports of the transmitting end device. This is not limited herein.

For example, the second virtual port of the transmitting end device is a logical port formed on four antenna elements deployed in any antenna unit of the antenna of the transmitting end device after the four antenna elements are weighted by a precoding matrix of the antenna elements in the antenna unit in Table 3, Table 4, Table 5, Table 6, Table 7, Table 8, Table 9, or Table 10. For example, the second virtual port of the transmitting end device may be a logical port formed after the four antenna elements are weighted by $$\frac{1}{2}\begin{bmatrix} 1 \\ 1 \\ 1 \\ 1 \end{bmatrix}.$$

Optionally, a quantity of second virtual ports of the transmitting end device may be the same as or different from a quantity of first virtual ports of the transmitting end device. This is not limited herein.

Optionally, both the first angle of arrival information and the second angle of arrival information are spatial angles, the first angle of arrival information includes a first azimuth and a first polar angle, and the second angle of arrival information includes a second azimuth and a second polar angle.

Optionally, that the transmitting end device sends a second reference signal on a first virtual port of the transmitting end device may be replaced with: The transmitting end device sends data of a data channel on the first virtual port of the transmitting end device. That is, the first angle of arrival information may be determined by the receiving end device based on the data of the data channel.

For example, if the first virtual port of the transmitting end device is a logical port formed after the four antenna elements are weighted by $$\frac{1}{2}\begin{bmatrix}1\\1\\1\\1\end{bmatrix},$$

the transmitting end device may send the data of the data channel on the first virtual port of the transmitting end device.

Optionally, that the transmitting end device sends the first reference signal to the receiving end device on a second virtual port of the transmitting end device based on the second angle of arrival information includes: The transmitting end device determines a third precoding matrix based on the second angle of arrival information, where the third precoding matrix is a precoding matrix of antenna elements in a first antenna unit of the transmitting end device, the third precoding matrix includes a matrix with n rows and m columns, n is a quantity of antenna elements in the first antenna unit of the transmitting end device, and m is a quantity of second virtual ports in the first antenna unit of the transmitting end device; and the transmitting end device sends the first reference signal to the receiving end device on virtual ports indicated by the m columns in the third precoding matrix.

For example, the third precoding matrix may be, for example, $$\frac{1}{2}\begin{bmatrix}1 & 0\\0 & 0\\0 & 0\\0 & 1\end{bmatrix}$$

in Table 8. In this case, n is 4, and m is 2.

It can be learned that, in the foregoing technical solution, a virtual port is determined by using a third precoding matrix, and a reference signal is sent on the virtual port, so that multi-polarization omnidirectional and directional beams are implemented, thereby improving a space diversity capacity and robustness of a transmission system.

Optionally, if the second angle of arrival information is greater than or equal to a first threshold, the third precoding matrix is a precoding matrix used to generate the first polarization and the second polarization, or the third precoding matrix is a precoding matrix used to generate the first polarization and the third polarization. If the second angle of arrival information is greater than or equal to a second threshold and the second angle of arrival information is less than a first threshold, the third precoding matrix is a precoding matrix used to generate the first polarization, the second polarization, and the third polarization, or the third precoding matrix is a precoding matrix used to generate other polarization or another radiation pattern except the first polarization, the second polarization, and the third polarization. If the second angle of arrival information is less than a second threshold, the third precoding matrix is a precoding matrix used to generate the second polarization and the third polarization.

The first threshold is determined by the receiving end device based on a fourth reference signal, where an x-polarization received signal strength of the fourth reference signal is less than a first received signal strength threshold, or a y-polarization received signal strength of the fourth reference signal is less than a first received signal strength threshold, and the first signal strength threshold is sensitivity of a receiver of the receiving end device or a threshold defined in a standard. This is not limited herein. The second threshold is determined by the receiving end device based on the fourth reference signal, where a z-polarization received signal strength of the fourth reference signal is less than a second received signal strength threshold, and the second signal strength threshold is sensitivity of the receiver of the receiving end device or a threshold defined in a standard. This is not limited herein.

It should be noted that the fourth reference signal is sent by the transmitting end device. In a possible implementation, when antennas of the transmitting end device and the receiving end device are both triple-polarization antennas, the transmitting end device sends the fourth reference signal.

Optionally, the receiving end device may measure, at different locations, the fourth reference signal sent by the transmitting end device, to obtain the x-polarization received signal strength of the fourth reference signal, the y-polarization received signal strength of the fourth reference signal, and the z-polarization received signal strength of the fourth reference signal at the different locations. That is, the first threshold may be a minimum value of at least one first threshold, and the at least one first threshold is determined by receiving end devices at the different locations based on the fourth reference signal. The second threshold may be a maximum value of at least one second threshold, and the at least one second threshold is determined by the receiving end devices at the different locations based on the fourth reference signal.

The fourth reference signal may include one of the following: a synchronization signal block (SSB), a channel state reference signal (CSI-RS), a sounding reference signal (SRS), and the like.

Figure 20:
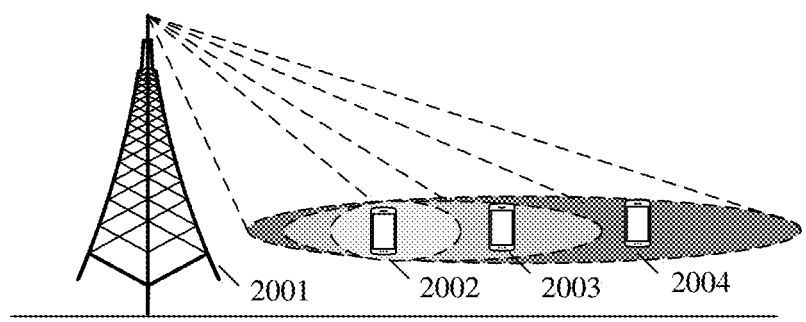
FIG. 20 is a schematic diagram of determining a first threshold and a second threshold according to an embodiment of this application.

For example, FIG. 20 is a schematic diagram of determining a first threshold and a second threshold according to an embodiment of this application. FIG. 20 shows a receiving end device 2002 at a first location, a receiving end device 2003 at a second location, and a receiving end device 2004 at a third location. In addition, the receiving end device 2002 is closest to a transmitting end device 2001, and the receiving end device 2004 is farthest from the transmitting end device 2001. When the transmitting end device 2001 sends a fourth reference signal, the receiving end device 2002 may measure the fourth reference signal, to obtain an x-polarization received signal strength of the fourth reference signal at the first location, a y-polarization received signal strength of the fourth reference signal at the first location, and a z-polarization received signal strength of the fourth reference signal at the first location. The receiving end device 2003 may measure the fourth reference signal, to obtain an x-polarization received signal strength of the fourth reference signal at the second location, a y-polarization received signal strength of the fourth reference signal at the second location, and a z-polarization received signal strength of the fourth reference signal at the second location. The receiving end device 2004 may measure the fourth reference signal, to obtain an x-polarization received signal strength of the fourth reference signal at the third location, a y-polarization received signal strength of the fourth reference signal at the third location, and a z-polarization received signal strength of the fourth reference signal at the third location. If the x-polarization received signal strength or the y-polarization received signal strength of the fourth reference signal at the first location are less than a first signal strength threshold, and the x-polarization received signal strength or the y-polarization received signal strength of the fourth reference signal at the second location, and the x-polarization received signal strength or the y-polarization received signal strength of the fourth reference signal at the third location are all greater than the first signal strength threshold, the first threshold is angle of arrival information determined by the receiving end device 2002 based on the fourth reference signal. If the x-polarization received signal strength or the y-polarization received signal strength of the fourth reference signal at the first location, the x-polarization received signal strength or the y-polarization received signal strength of the fourth reference signal at the second location, and the x-polarization received signal strength or the y-polarization received signal strength of the fourth reference signal at the third location are all less than a first signal strength threshold, the first threshold is a minimum value of angle of arrival information determined by the receiving end device 2002 based on the fourth reference signal, angle of arrival information determined by the receiving end device 2003 based on the fourth reference signal, and angle of arrival information determined by the receiving end device 2004 based on the fourth reference signal. Similarly, if the z-polarization received signal strength of the fourth reference signal at the first location is less than a second signal strength threshold, and both the z-polarization received signal strength of the fourth reference signal at the second location and the z-polarization received signal strength of the fourth reference signal at the third location are greater than the second signal strength threshold, the second threshold is angle of arrival information determined by the receiving end device 2002 based on the fourth reference signal. If the z-polarization received signal strength of the fourth reference signal at the first location, the z-polarization received signal strength of the fourth reference signal at the second location, and the z-polarization received signal strength of the fourth reference signal at the third location are all less than a second signal strength threshold, the first threshold is a maximum value of angle of arrival information determined by the receiving end device 2002 based on the fourth reference signal, angle of arrival information determined by the receiving end device 2003 based on the fourth reference signal, and angle of arrival information determined by the receiving end device 2004 based on the fourth reference signal. Optionally, if the second angle of arrival information is greater than or equal to the first threshold, it indicates that a channel capacity of an x-y-z-triple-polarization antenna is the largest, and a channel capacity of an x-y-dual-polarization antenna is close to or equal to a channel capacity of an x single-polarization antenna, or a channel capacity of an x-y-dual-polarization antenna is close to or equal to a channel capacity of a y single-polarization antenna. In this case, the third precoding matrix may be, for example, any precoding matrix in Table 3 or Table 4.

Optionally, if the second angle of arrival information is greater than or equal to the second threshold, and the second angle of arrival information is less than the first threshold, it indicates that a channel capacity of an x-y-z-triple-polarization antenna is greater than a channel capacity of a dual-polarization antenna, and a channel capacity of the dual-polarization antenna is greater than a channel capacity of a single-polarization antenna. The dual-polarization antenna may be, for example, an x-y-dual-polarization antenna, an x-z-dual-polarization antenna, or a y-z-dual-polarization antenna. The single-polarization antenna may be, for example, an x-single-polarization antenna, a y-single-polarization antenna, or a z-single-polarization antenna. In this case, the third precoding matrix may be, for example, any precoding matrix in Table 7 to Table 10.

Optionally, if the second angle of arrival information is less than the second threshold, it indicates that a channel capacity of an x-y-z-triple-polarization antenna is equal to a channel capacity of a dual-polarization antenna, and the channel capacity of the dual-polarization antenna is greater than a channel capacity of a single-polarization antenna. In this case, the third precoding matrix may be, for example, any precoding matrix in Table 5 or Table 6.

It can be learned that, in the foregoing technical solution, a third precoding matrix is determined in different cases.

1902: The receiving end device determines first indication information based on the first reference signal.

Optionally, the first indication information is used to indicate a first precoding matrix.

Optionally, the first precoding matrix includes a matrix with e rows and f columns, where e is a quantity of second virtual ports of x antenna units of the transmitting end device, f is a quantity of data streams transmitted through the second virtual ports of the x antenna units of the transmitting end device, and the x antenna units are configured to send the first reference signal.

For example, the first precoding matrix is $$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

or $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

Optionally, the first antenna unit may be any one of the x antenna units.

1903: The receiving end device sends the first indication information to the transmitting end device, and correspondingly, the transmitting end device receives the first indication information sent by the receiving end device.

1904: The transmitting end device determines a second precoding matrix based on the first indication information.

Optionally, that the transmitting end device determines a second precoding matrix based on the first indication information includes: The transmitting end device determines the first precoding matrix indicated by the first indication information; and the transmitting end device determines the second precoding matrix based on the first precoding matrix and the third precoding matrix.

Optionally, the second precoding matrix is a precoding matrix of an antenna of the transmitting end device.

Optionally, the second precoding matrix includes a matrix with i rows and j columns, where i is a quantity of all antenna elements in the x antenna units of the transmitting end device, and j is a quantity of data streams transmitted by all antenna elements in the x antenna units of the transmitting end device.

Optionally, if the first precoding matrix is $$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

and the third precoding matrix is $$\begin{bmatrix} 1 & 1 & 1 & 0 & 0 & 0 \\ 1 & -1 & -1 & 0 & 0 & 0 \\ 1 & j & -j & 0 & 0 & 0 \\ 1 & -j & j & 0 & 0 & 0 \\ 0 & 0 & 0 & 1 & 1 & 1 \\ 0 & 0 & 0 & 1 & -1 & -1 \\ 0 & 0 & 0 & 1 & j & -j \\ 0 & 0 & 0 & 1 & -j & j \end{bmatrix}.$$

the second precoding matrix is $$\begin{bmatrix} 1 & 1 & 1 \\ 1 & -1 & -1 \\ 1 & j & -j \\ 1 & -j & j \end{bmatrix},$$

It should be noted that, it is assumed that both the transmitting end device and the receiving end device include two antenna units, and each antenna unit of the transmitting end device and the receiving end device is equivalent to a three-port antenna. In other words, a quantity of virtual ports corresponding to each antenna unit of the transmitting end device and the receiving end device is 3. In this case, it is assumed that the third precoding matrix is $$\begin{bmatrix} 1 & 1 & 1 \\ 1 & -1 & -1 \\ 1 & j & -j \\ 1 & -j & j \end{bmatrix}.$$

In the third precoding matrix, 1 is used to indicate an excitation signal whose amplitude is 1 and phase is 0°, −1 is used to indicate an excitation signal whose amplitude is 1 and phase is 180°, j is used to indicate an excitation signal whose amplitude is 1 and phase is 90°, −j is used to indicate an excitation signal whose amplitude is 1 and phase is −90°, and 0 is used to indicate an excitation signal whose amplitude is 0.

Optionally, in the third precoding matrix, a first column represents z polarization, a second column represents an RHCP, and a third column represents an LHCP.

Optionally, 1 in any row in the first precoding matrix is used to indicate to transmit, on a second virtual port corresponding to 1 in any row, a data stream in a column in which 1 in any row is located by using an excitation signal whose amplitude is 1 and phase is 0°. For example, 1 in a third row in the first precoding matrix is used to indicate to transmit, on a second virtual port corresponding to 1 in the third row, a data stream in a third column in which 1 in the third row is located by using an excitation signal whose amplitude is 1 and phase is 0°.

Optionally, the first precoding matrix is a matrix with six rows and six columns, indicating that a quantity of second virtual ports of the two antenna units of the transmitting end device is 6, and a quantity of data streams transmitted through the second virtual ports of the two antenna units of the transmitting end device is 6. Therefore, the first precoding matrix is full-rank transmission in which six data streams are transmitted from six second virtual ports.

Optionally, it is assumed that both the transmitting end device and the receiving end device include two antenna units, and each antenna unit of the transmitting end device and the receiving end device is equivalent to a dual-port antenna. In other words, a quantity of virtual ports corresponding to each antenna unit of the transmitting end device and the receiving end device is 2. In this case, it is assumed that the third precoding matrix is $$\begin{bmatrix} 1 & 0 \\ -1 & 0 \\ 0 & 1 \\ 0 & -1 \end{bmatrix}.$$

In the third precoding matrix, 1 is used to indicate an excitation signal whose amplitude is 1 and phase is 0°, −1 is used to indicate an excitation signal whose amplitude is 1 and phase is 180°, and 0 is used to indicate an excitation signal whose amplitude is 0.

Optionally, if the first precoding matrix is $$\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

and the third precoding matrix is $$\begin{bmatrix} 1 & 0 \\ -1 & 0 \\ 0 & 1 \\ 0 & -1 \end{bmatrix},$$

the second precoding matrix is $$\begin{bmatrix} 1 & 0 & 0 & 0 \\ -1 & 0 & 0 & 0 \\ 0 & 1 & 0 & 0 \\ 0 & -1 & 0 & 0 \\ 0 & 0 & 1 & 0 \\ 0 & 0 & -1 & 0 \\ 0 & 0 & 0 & 1 \\ 0 & 0 & 0 & -1 \end{bmatrix}.$$

Optionally, 1 in any row in the first precoding matrix is used to indicate to transmit, on a second virtual port corresponding to 1 in any row, a data stream in a column in which 1 in any row is located by using an excitation signal whose amplitude is 1 and phase is 0°. For example, 1 in a third row in the first precoding matrix is used to indicate to transmit, on a second virtual port corresponding to 1 in the third row, a data stream in a third column in which 1 in the third row is located by using an excitation signal whose amplitude is 1 and phase is 0°.

Optionally, the first precoding matrix is a matrix with four rows and four columns, indicating that a quantity of second virtual ports of the two antenna units of the transmitting end device is 4, and a quantity of data streams transmitted through the second virtual ports of the two antenna units of the transmitting end device is 4. Therefore, the first precoding matrix is full-rank transmission in which four data streams are transmitted from four second virtual ports.

In addition, the transmitting end device may further perform normalization processing on the second precoding matrix.

For example, the transmitting end device performs normalization processing on $$\begin{bmatrix} 1 & 0 & 0 & 0 \\ -1 & 0 & 0 & 0 \\ 0 & 1 & 0 & 0 \\ 0 & -1 & 0 & 0 \\ 0 & 0 & 1 & 0 \\ 0 & 0 & -1 & 0 \\ 0 & 0 & 0 & 1 \\ 0 & 0 & 0 & -1 \end{bmatrix}$$

to obtain $$\frac{1}{2\sqrt{2}} \begin{bmatrix} 1 & 0 & 0 & 0 \\ -1 & 0 & 0 & 0 \\ 0 & 1 & 0 & 0 \\ 0 & -1 & 0 & 0 \\ 0 & 0 & 1 & 0 \\ 0 & 0 & -1 & 0 \\ 0 & 0 & 0 & 1 \\ 0 & 0 & 0 & -1 \end{bmatrix}.$$

1905: The transmitting end device sends, to the receiving end device, data precoded based on the second precoding matrix, and correspondingly, the receiving end device receives the data that is precoded based on the second precoding matrix and that is sent by the transmitting end device.

Optionally, the antenna described in the foregoing embodiments is deployed on both the transmitting end device and the receiving end device.

It can be learned that, in the foregoing technical solution, different virtual ports are configured, and different reference signals are sent on the different virtual ports, so that a second precoding matrix is more accurately determined, to transmit data precoded based on the second precoding matrix.

Optionally, that a receiving end device receives the first reference signal includes: The receiving end device receives the second reference signal sent by the transmitting end device on the first virtual port of the transmitting end device; the receiving end device determines the first angle of arrival information based on the second reference signal; the receiving end device sends the third reference signal to the transmitting end device on the first virtual port of the receiving end device based on the first angle of arrival information; the receiving end device receives the first reference signal sent by the transmitting end device to the receiving end device on the second virtual port of the transmitting end device, where the second virtual port of the transmitting end device is determined based on the second angle of arrival information, and the second angle of arrival information is determined by the transmitting end device based on the third reference signal.

Optionally, there is one or more first virtual ports of the receiving end device. This is not limited herein.

For example, the first virtual port of the receiving end device is a logical port formed on four antenna elements deployed in any antenna unit of an antenna of the transmitting end device after the four antenna elements are weighted by a precoding matrix of the antenna elements in the antenna unit in Table 3, Table 4, Table 5, Table 6, Table 7, Table 8, Table 9, or Table 10. For example, the first virtual port of the receiving end device may be a logical port formed after the four antenna elements are weighted by $$\frac{1}{2}\begin{bmatrix} 1 \\ 1 \\ 1 \\ 1 \end{bmatrix}.$$

Optionally, before the receiving end device determines the first angle of arrival information based on the second reference signal, the method further includes: The receiving end device determines channel state information based on the second reference signal.

The channel state information includes first information and second information. The first information is a channel environment with a large line-of-sight component, and the second information is a channel environment with abundant scattering paths.

Optionally, that the receiving end device determines the first angle of arrival information based on the second reference signal includes: If the channel state information is the first information, the receiving end device determines the first angle of arrival information based on the second reference signal.

Optionally, after the receiving end device determines the channel state information based on the second reference signal, the method further includes: If the channel state information is the second information, the receiving end device sends second indication information to the transmitting end device, where the second indication information is used to indicate the transmitting end device to send a fifth reference signal to the receiving end device through a third virtual port of the transmitting end device; and the receiving end device determines third indication information based on the fifth reference signal, where the third indication information is used to indicate a fifth precoding matrix.

In this case, the transmitting end device determines a sixth precoding matrix based on the third indication information. The transmitting end device sends, to the receiving end device, data precoded based on the sixth precoding matrix, and correspondingly, the receiving end device receives the data that is precoded based on the sixth precoding matrix and that is sent by the transmitting end device.

Optionally, that the transmitting end device determines a sixth precoding matrix based on the third indication information includes: The transmitting end device determines the fifth precoding matrix indicated by the third indication information; and the transmitting end device determines the sixth precoding matrix based on the fifth precoding matrix and a seventh precoding matrix.

Optionally, the fifth precoding matrix includes a matrix with u rows and v columns, where u is a quantity of third virtual ports of y antenna units of the transmitting end device, and v is a quantity of data streams transmitted through the third virtual ports of the y antenna units of the transmitting end device. The y antenna units are configured to send the fifth reference signal. The y antenna units may be all or some of the x antenna units, or the y antenna units are other antenna units except the x antenna units, or the y antenna units include some of the x antenna units and another antenna unit except the x antenna units. This is not limited herein.

Optionally, the fifth precoding matrix may be the same as or different from the first precoding matrix. This is not limited herein.

Optionally, the seventh precoding matrix is a precoding matrix used to generate the first polarization, the second polarization, and the third polarization, or a precoding matrix used to generate other polarization except the first polarization, the second polarization, and the third polarization. The sixth precoding matrix is a precoding matrix of an antenna of the transmitting end device.

Optionally, the third virtual port of the transmitting end device is determined based on the seventh precoding matrix. The seventh precoding matrix is a precoding matrix of the antenna elements in the antenna unit in Table 7, Table 8, Table 9, or Table 10.

Optionally, if the fifth precoding matrix is the same as the first precoding matrix, and the seventh precoding matrix is the same as the third precoding matrix, the sixth precoding matrix is the same as the second precoding matrix. In addition, for the sixth precoding matrix, refer to the second precoding matrix. Details are not described herein again.

Optionally, there is one or more third virtual ports of the transmitting end device. This is not limited herein.

For example, the third virtual port of the transmitting end device is a logical port formed on four antenna elements deployed in any antenna unit of the antenna of the transmitting end device after the four antenna elements are weighted by the seventh precoding matrix. For example, the third virtual port of the transmitting end device may be a logical port formed after the four antenna elements are weighted by $$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}.$$

Optionally, a quantity of third virtual ports of the transmitting end device is greater than or equal to the quantity of first virtual ports of the transmitting end device. For example, the quantity of third virtual ports of the transmitting end device is 3, and the quantity of first virtual ports of the transmitting end device is 2.

Optionally, the fifth reference signal may include one of the following: a synchronization signal block (SSB), a channel state reference signal (CSI-RS), a sounding reference signal (SRS), and the like.

Optionally, when the transmitting end device determines, based on empirical data, that current channel state information is the second information, the transmitting end device may send the fifth reference signal to the receiving end device on the third virtual port of the transmitting end device.

Optionally, when the receiving end device determines, based on the empirical data, that the current channel state information is the second information, the receiving end device may send the second indication information to the transmitting end device.

It can be learned that, in the foregoing technical solution, different virtual ports are configured, and different reference signals are sent on the different virtual ports, so that a sixth precoding matrix is more accurately determined, to transmit data precoded based on the sixth precoding matrix.

Optionally, that the receiving end device sends the third reference signal to the transmitting end device on the first virtual port of the receiving end device based on the first angle of arrival information may be replaced with: The receiving end device sends, data of a data channel to the transmitting end device on the first virtual port of the receiving end device based on the first angle of arrival information. That is, the second angle of arrival information may be determined by the transmitting end device based on the data of the data channel.

For example, if the first virtual port of the receiving end device is a logical port formed after the four antenna elements are weighted by $$\frac{1}{2}\begin{bmatrix} 1 \\ 1 \\ 1 \\ 1 \end{bmatrix},$$

the receiving end device may send the data of the data channel on the first virtual port of the receiving end device to the transmitting end device based on the first angle of arrival information.

Optionally, that the receiving end device sends the third reference signal to the transmitting end device on the first virtual port of the receiving end device based on the first angle of arrival information includes: The receiving end device determines a fourth precoding matrix based on the first angle of arrival information, where the fourth precoding matrix is a precoding matrix of antenna elements in a first antenna unit of the receiving end device, the fourth precoding matrix includes a matrix with p rows and q columns, p is a quantity of antenna elements in the first antenna unit of the receiving end device, and q is a quantity of first virtual ports in the first antenna unit of the receiving end device; and the receiving end device sends the third reference signal to the transmitting end device on virtual ports indicated by the q columns in the fourth precoding matrix.

For example, the fourth precoding matrix may be, for example, $$\frac{1}{2}\begin{bmatrix} 1 & 0 \\ 0 & 0 \\ 0 & 0 \\ 0 & 1 \end{bmatrix}$$

in Table 8. In this case, p is 4, and q is 2.

It can be learned that, in the foregoing technical solution, a virtual port is determined by using a fourth precoding matrix, and a reference signal is sent on the virtual port, so that multi-polarization omnidirectional and directional beams are implemented, thereby improving a space diversity capacity and robustness of a transmission system.

Optionally, if the first angle of arrival information is greater than or equal to the first threshold, the fourth precoding matrix is a precoding matrix used to generate the first polarization and the second polarization, or the fourth precoding matrix is a precoding matrix used to generate the first polarization and the third polarization. If the first angle of arrival information is greater than or equal to the second threshold and the first angle of arrival information is less than the first threshold, the fourth precoding matrix is a precoding matrix used to generate the first polarization, the second polarization, and the third polarization, or the fourth precoding matrix is a precoding matrix used to generate other polarization or another radiation pattern except the first polarization, the second polarization, and the third polarization. If the first angle of arrival information is less than the second threshold, the fourth precoding matrix is a precoding matrix used to generate the second polarization and the third polarization.

Optionally, if the first angle of arrival information is greater than or equal to the first threshold, it indicates that a channel capacity of an x-y-z-triple-polarization antenna is the largest, and a channel capacity of an x-y-dual-polarization antenna is close to or equal to a channel capacity of an x single-polarization antenna, or the channel capacity of the x-y-dual-polarization antenna is close to or equal to a channel capacity of a y single-polarization antenna. In this case, the fourth precoding matrix may be, for example, any precoding matrix in Table 3 or Table 4.

Optionally, if the first angle of arrival information is greater than or equal to the second threshold, and the first angle of arrival information is less than the first threshold, it indicates that a channel capacity of an x-y-z-triple-polarization antenna is greater than a channel capacity of a dual-polarization antenna, and a channel capacity of the dual-polarization antenna is greater than a channel capacity of a single-polarization antenna. The dual-polarization antenna may be, for example, an x-y-dual-polarization antenna, an x-z-dual-polarization antenna, or a y-z-dual-polarization antenna. The single-polarization antenna may be, for example, an x-single-polarization antenna, a y-single-polarization antenna, or a z-single-polarization antenna. In this case, the fourth precoding matrix may be, for example, any precoding matrix in Table 7 to Table 10.

Optionally, if the first angle of arrival information is less than the second threshold, it indicates that a channel capacity of an x-y-z-triple-polarization antenna is equal to a channel capacity of a dual-polarization antenna, and the channel capacity of the dual-polarization antenna is greater than a channel capacity of a single-polarization antenna. In this case, the fourth precoding matrix may be, for example, any precoding matrix in Table 5 or Table 6.

It can be learned that, in the foregoing technical solution, a fourth precoding matrix is determined in different cases.

The following describes beneficial effects that can be implemented in the foregoing embodiments with reference to simulation data.

With reference to FIG. 18, each antenna unit may be equivalent to three vertically arranged half-wave dipole antenna elements. A radiation pattern of an ideal half-wavelength dipole antenna may be obtained by calculating radiation fields of each infinitesimal current element and integrating the radiation fields along a dipole with a specific current distribution. The radiation pattern may be used for subsequent calculation of a channel capacity. It is assumed that a transmit signal is $s \in \mathbb{C}^{3N \times L}$, a receive signal may be represented as $y = Hs + \tilde{n}$, where $\tilde{n} \in \mathbb{C}^{3M \times L}$ is noise, L is a quantity of transmitted data streams, a channel matrix H=

$$\begin{bmatrix} H_{xx} & H_{xy} & H_{xz} \\ H_{yx} & H_{yy} & H_{yz} \\ H_{zx} & H_{zy} & H_{zz} \end{bmatrix},$$

and a subscript represents different transmit and receive antenna polarization. 3N and 3M are a total quantity of transmit and receive polarized antenna elements, respectively. It is assumed that vacuum transmission is performed, a channel matrix from an $m^{th}$ receive antenna element to an $n^{th}$ transmit antenna element may be represented as $h_{mn}=$ $$h_{mn} = \frac{\sqrt{G_T G_R}\,\lambda}{4\pi d_{mn}} e^{-jkd_{mn}} \cdot f_T(\theta_{mn}^T, \phi_{mn}^T) \cdot f_R(\theta_{mn}^R, \phi_{mn}^R),$$

where $\lambda$ is a wavelength in the vacuum, $k=2\pi/\lambda$ is a transmission constant, $G_T$ is a maximum gain of the transmit antenna element, $G_R$ is a maximum gain of the receive antenna element, d is a distance between a center of a transmit UCA array and a center of a receive UCA array, $d_{mn}$ is a distance between the $m^{th}$ receive antenna element $(x_m, y_m, z_m)$ and the $n^{th}$ transmit antenna element $(x_n, y_n, z_n)$ in a global coordinate system (GCS), and $d_{mn}=\sqrt{(x_n-x_m)^2+(y_n-y_m)^2+(z_n-z_m)^2}$. $f_T(\theta_{mn}^T, \phi_{mn}^T)$ and $f_R(\theta_{nm}^R, \phi_{nm}^R)$ are normalized patterns of transmit and receive antenna elements. $\theta_{mn}^T$ and $\phi_{mn}^T$ represent an included angle and an azimuth of the $m^{th}$ receive antenna element relative to the $n^{th}$ transmit antenna element in a positive direction of a z-axis in a local coordinate system (LCS) of the $n^{th}$ transmit antenna element, $\theta_{mn}^R$ and $\phi_{mn}^R$ represent an included angle and an azimuth of the $n^{th}$ transmit antenna element relative to the $m^{th}$ receive antenna element in a positive direction of a z-axis in a local coordinate system (LCS) of the $m^{th}$ receive antenna element. It may be understood that, in this application, a transmit antenna is an antenna of the transmitting end device, and a receive antenna is an antenna of the receiving end device. The transmit antenna element is an antenna element in the antenna of the transmitting end device, and the receive antenna element is an antenna element in the antenna of the receiving end device.

Assuming that channel information of a receiving end and a transmitting end is known, and a channel capacity of a UCA transmission system may be obtained in a singular value decomposition manner, $$C = \sum_{i=1}^{K} \log_2\left(1 + \frac{P_i^* \lambda_i^2}{N_0}\right),$$

where K is a total quantity of channels, and $\lambda_i$ and $P^*_i$ are a normalized singular value and a power allocated to each channel by using a water-filling algorithm, and $N_0$ is noise power. In addition, total transmission power is consistent in different cases.

Figure 21:
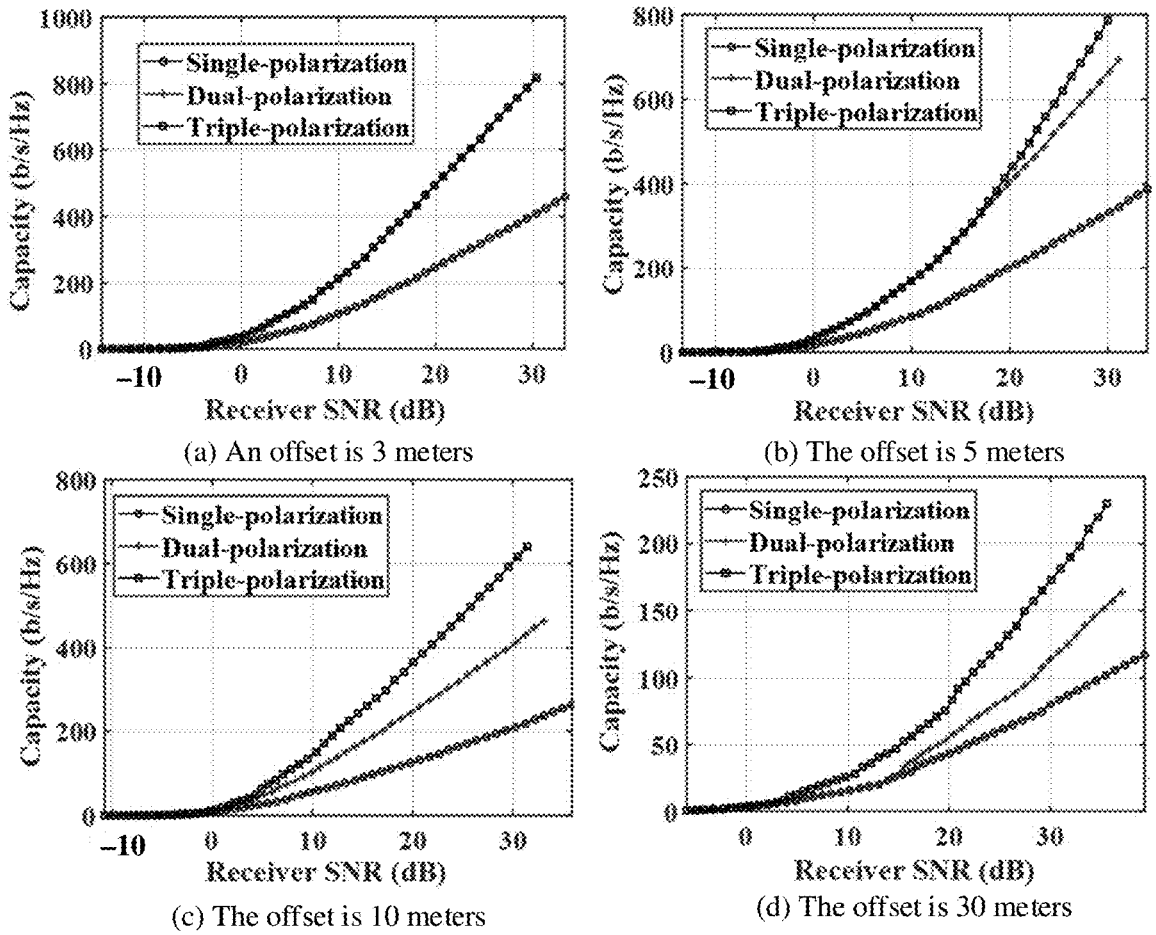
FIG. 21 is a schematic diagram of a channel capacity according to an embodiment of this application.

It is assumed that an operating frequency is 28 GHz, a total quantity of transmit antenna elements and a total quantity of receive antenna elements are both 64, radiuses of the transmit UCA array and the receive UCA array are both 0.6 meters, and a distance between the center of the transmit UCA array and the center of the receive UCA array is 10 meters. In this case, channel capacities of a single-polarization (x-polarization only), dual-polarization (x-polarization and y-polarization), and triple-polarization (x-polarization, y-polarization, and z-polarization) UCA systems may be obtained through the foregoing calculation. For a result, refer to FIG. 21. FIG. 21 is a schematic diagram of a channel capacity according to an embodiment of this application. When axes of UCA arrays at a receiving end and a transmitting end are aligned or offset slightly, as shown in FIG. 21(a), when the offset of the receiving end relative to the transmitting end on both an x axis and a y axis is 3 meters, capacity curves of a dual-polarization UCA array and a triple-polarization UCA array overlap, which means that the third polarization does not improve the channel capacity in this case. As the offset increases, as shown in FIG. 21(b) to (d), a capacity of the triple-polarization UCA is greater than that of the dual-polarization or single-polarization UCA, because the z electric field component of the triple-polarization antenna is large. When the offset continues to increase, as shown in FIG. 21(d), when the offset is 30 meters, the channel capacity of the dual-polarization antenna gradually is close to a channel capacity of a single-polarization antenna. This is due to three-dimensional space symmetry of an equivalent triple-polarization antenna. When the offset is large, components of an electromagnetic wave in an xy plane gradually decrease. Therefore, in a MIMO channel environment in which a line-of-sight component is large, a third field component, namely, a component of the electromagnetic wave in a z direction, when there is an offset at the receiving end and the transmitting end, is greater than that when there is no offset at the receiving end and the transmitting end. In this case, an excitation signal of each antenna port may be adjusted to make full use of a space diversity degree of freedom of a polarized MIMO system, thereby improving robustness of a wireless communication system. In an NLOS MIMO channel with abundant scattering paths, there is no limitation that the transmitting end and the receiving end are not aligned, because a size of each component of the electromagnetic field is not only affected by patterns of antennas of the transmitting end and the receiving end, but also affected by a scattering body in a channel.

Optionally, with reference to FIG. 19, if the transmitting end device is a network device and the receiving end device is a terminal device, both the first reference signal and the second reference signal are a CSI-RS, the third reference signal is an SRS, and the first indication information is a precoding matrix indicator (PMI). If the transmitting end device is a terminal device and the receiving end device is a network device, both the first reference signal and the second reference signal are an SRS, the third reference signal is a CSI-RS, and the first indication information is a transmitted precoding matrix indicator (transmitted precoding matrix indicator, TPMI).

Optionally, in a system meeting channel reciprocity, if the transmitting end device is a network device and the receiving end device is a terminal device, the method includes: The network device sends a first reference signal; the network device receives an SRS sent by the terminal device in each column of a first precoding matrix, where the first precoding matrix is determined based on the first reference signal; the network device determines an optimal SRS based on the SRS sent by the terminal device in each column of the first precoding matrix; the network device sends an SRS resource indicator (SRS resource indicator, SRI) to the terminal device, where the SRI is used to indicate the optimal SRS; and the network device receives data obtained after the terminal device performs precoding based on an eighth precoding matrix, where the eighth precoding matrix is determined based on the SRI.

Optionally, for sending the first reference signal by the network device, refer to sending the first reference signal by the transmitting end device in FIG. 19. Details are not described herein again.

Optionally, both the first reference signal and the second reference signal are a CSI-RS, and the third reference signal is an SRS.

Optionally, for the first precoding matrix, refer to the description of the first precoding matrix in FIG. 19. Details are not described herein again.

Optionally, the eighth precoding matrix is similar to the second precoding matrix. For details, refer to the second precoding matrix. Details are not described herein.

Optionally, in the system meeting channel reciprocity, if the transmitting end device is a network device, and the receiving end device is a terminal device, the method further includes: The terminal device receives a first reference signal; the terminal device sends an SRS to the network device in each column of a first precoding matrix, where the first precoding matrix is determined based on the first reference signal; the terminal device receives an SRI sent by the network device, where the SRI is used to indicate an optimal SRS; the terminal device determines an eighth precoding matrix based on the SRI; the terminal device sends, to the network device, data precoded based on the eighth precoding matrix.

Optionally, for receiving the first reference signal by the terminal device, refer to receiving the first reference signal by the receiving end device in FIG. 19. Details are not described herein again.

Optionally, that the terminal device determines an eighth precoding matrix based on the SRS resource indicator includes: The terminal device determines, based on the SRS resource indicator, an eighth precoding matrix corresponding to an optimal SRS; and the terminal device determines the eighth precoding matrix based on a ninth precoding matrix and a fourth precoding matrix.

Optionally, the ninth precoding matrix is determined based on one or more columns in the first precoding matrix, and the one or more columns in the first precoding matrix are one or more columns corresponding to the optimal SRS.

It may be understood that the system meeting channel reciprocity is applicable to a time division duplex (TDD) system and a non-codebook-based uplink data transmission scenario.

The foregoing mainly describes the solutions provided in this application from the perspective of interaction between devices. It may be understood that, to implement the foregoing functions, each device includes a corresponding hardware structure and/or software module for performing each function. A person of ordinary skill in the art should easily be aware that, in combination with modules and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the transmitting end device or the receiving end device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in embodiments of this application, division into modules is an example, and is merely a logical function division. In actual implementation, another division manner may be used.

Figure 22:
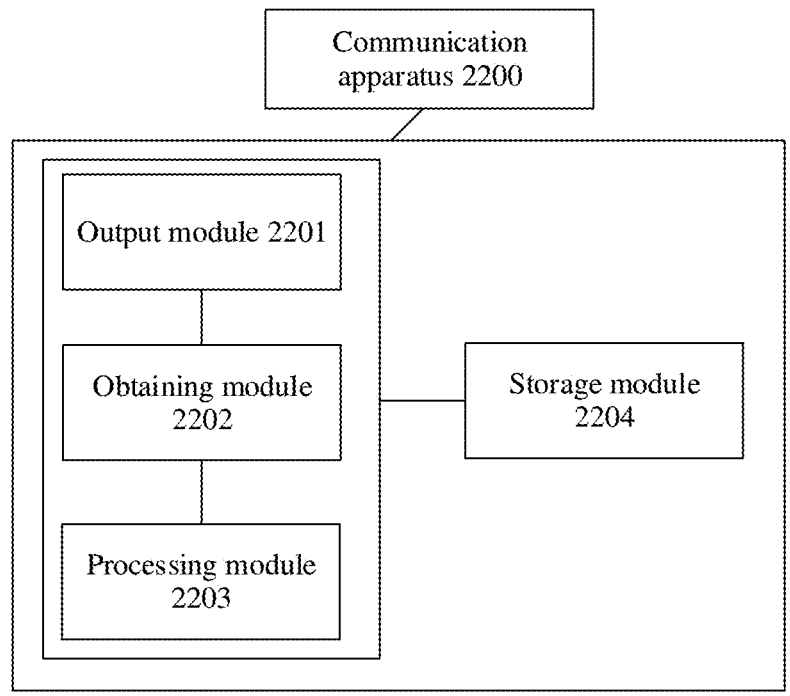
FIG. 22 is a schematic diagram of a structure of a communication apparatus according to an embodiment of this application.

When an integrated module is used, FIG. 22 is a schematic diagram of a structure of a communication apparatus according to an embodiment of this application. A communication apparatus 2200 may be applied to the method shown in FIG. 19. As shown in FIG. 22, the communication apparatus 2200 includes an output module 2201, an obtaining module 2202, and a processing module 2203. The processing module 2203 may be one or more processors, and the output module 2201 and the obtaining module 2202 may be a transceiver or a communication interface. The communication apparatus may be configured to implement the transmitting end device or the receiving end device in any one of the foregoing method embodiments, or configured to implement functions of the devices in any one of the foregoing method embodiments. For example, the communication apparatus includes a transmitting end device or a receiving end device. The device or network function may be a network element in a hardware device, a software function running on dedicated hardware, or a virtualized function instantiated on a platform (for example, a cloud platform). Optionally, the communication apparatus 2200 may further include a storage module 2204, configured to store program code and data that are of the communication apparatus 2200.

For example, when the communication apparatus is used as a transmitting end device or a chip applied to a transmitting end device, and performs the steps performed by the transmitting end device in the foregoing method embodiments, the output module 2201 and/or the obtaining module 2202 are/is configured to support communication with a receiving end device and/or the like, and specifically perform/performs a sending and/or receiving action performed by the transmitting end device in FIG. 19. Details are not described herein again. For example, the output module 2201 supports the transmitting end device in performing one or more steps in steps 1901 and 1905, and the obtaining module 2202 supports the transmitting end device in performing step 1903, and/or is used in another process of the technology described in this specification. The processing module 2203 may be configured to support the communication apparatus 2200 in performing the processing actions in the foregoing method embodiments. Details are not described herein again. For example, the processing module 2203 supports the transmitting end device in performing step 1904, and/or is used in another process of the technology described in this specification.

For example, when the communication apparatus is used as a receiving end device or a chip applied to a receiving end device, and performs the steps performed by the receiving end device in the foregoing method embodiments, the output module 2201 and/or the obtaining module 2202 are/is configured to support communication with a transmitting end device and/or the like, and specifically perform/performs a sending and/or receiving action performed by the receiving end device in FIG. 19. Details are not described herein again. For example, the output module 2201 supports the receiving end device in performing step 1903, and/or is used in another process of the technology described in this specification. For example, the obtaining module 2202 supports the receiving end device in performing step 1901, and/or is used in another process of the technology described in this specification. The processing module 2203 may be configured to support the communication apparatus 2200 in performing the processing actions in the foregoing method embodiments. Details are not described herein again. For example, the processing module 2203 supports the receiving end device in performing step 1902, and/or is used in another process of the technology described in this specification.

In a possible implementation, when the communication apparatus is a chip, the output module 2201 and the obtaining module 2202 may be an interface, a pin, a circuit, or the like. The interface may be used to input to-be-processed data to a processor, and may output a processing result of the processor to the outside. During specific implementation, the interface may be a general purpose input output (GPIO) interface, and may be connected to a plurality of peripheral devices (for example, a display (LCD), a camera, a radio frequency (RF) module, and an antenna). The interface is connected to the processor through a bus.

The processing module 2203 may be a processor. The processor may execute computer-executable instructions stored in a storage module, so that the chip performs the method according to the embodiment in FIG. 19.

Further, the processor may include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor may be an application-specific integrated circuit (ASIC) architecture, a microprocessor without interlocked piped stages architecture (MIPS) architecture, an advanced reduced instruction set computing machine (ARM) architecture, a network processor (NP) architecture, or the like. The processor may be a single-core or multi-core processor.

The storage module 2204 may be a storage module inside the chip, for example, a register or a cache. Alternatively, the storage module 2204 may be a storage module located outside the chip, for example, a read-only memory (ROM), another type of static storage device that can store static information and instructions, or a random access memory (RAM).

It should be noted that a function corresponding to each of the processor and the interface may be implemented by using a hardware design, may be implemented by using a software design, or may be implemented by a combination of software and hardware. This is not limited herein.

An embodiment of this application further provides a communication apparatus, including a logic circuit and a communication interface. The communication interface is used to send a first reference signal to obtain first indication information, the logic circuit is configured to: determine a second precoding matrix based on the first indication information, and send, through the communication interface, data precoded based on the second precoding matrix, and the logic circuit is configured to implement the method according to any possible implementation in FIG. 19.

An embodiment of this application further provides a communication apparatus, including a logic circuit and a communication interface. The communication interface is used to obtain a first reference signal, the logic circuit is configured to: determine first indication information based on the first reference signal, and send the first indication information through the communication interface, and the logic circuit is configured to implement the method in any possible implementation in FIG. 19.

This application further provides a computer-readable storage medium. The computer-readable storage medium stores a computer program. When the computer program is run, the method according to any possible implementation in FIG. 19 is implemented.

This application further provides a computer program product. When a computer reads and executes the computer program product, the computer is enabled to implement the method in any possible implementation of FIG. 19.

Figure 23:
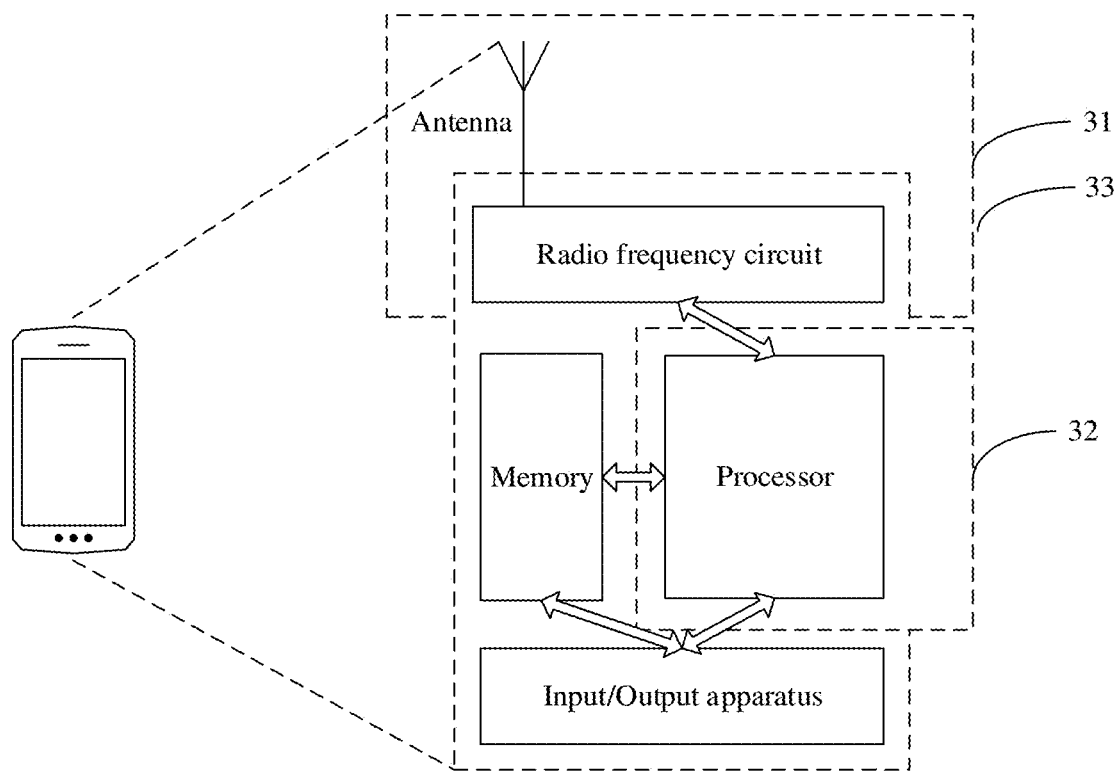
FIG. 23 is a simplified schematic diagram of a structure of a terminal device according to an embodiment of this application.

FIG. 23 is a simplified schematic diagram of a structure of a terminal device according to an embodiment of this application. For ease of understanding and illustration, an example in which the terminal device is a mobile phone is used in FIG. 23. As shown in FIG. 23, the terminal device includes at least one processor, and may further include a radio frequency circuit, an antenna, and an input/output apparatus. The processor may be configured to process a communication protocol and communication data, and may be further configured to control the terminal device, execute a software program, process data of the software program, and the like. The terminal device may further include a memory. The memory is mainly configured to store a software program and data. These related programs may be loaded into the memory when the communication apparatus is delivered from a factory, or may be loaded into the memory when needed later. The radio frequency circuit is mainly configured to: perform conversion between a baseband signal and a radio frequency signal, and process the radio frequency signal. The antenna is mainly configured to receive and send a radio frequency signal in an electromagnetic wave form, and the antenna is the antenna provided in embodiments of this application. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in an electromagnetic wave form through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 23 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 23, the terminal device includes a receiving module 31, a processing module 32, and a sending module 33. The receiving module 31 may also be referred to as a receiver, a receiver circuit, or the like. The sending module 33 may also be referred to as a transmitter, a transmitter circuit, or the like. The processing module 32 may also be referred to as a processor, a processing board, a processing apparatus, or the like.

For example, the processing module 32 is configured to perform a function of the transmitting end device or the receiving end device in the embodiment shown in FIG. 19.

Figure 24:
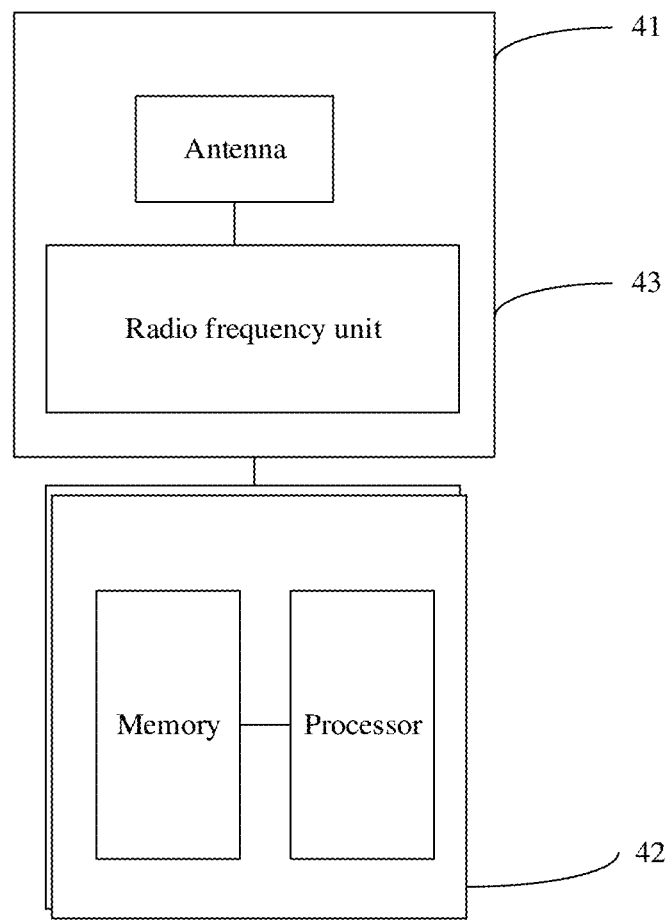
FIG. 24 is a simplified schematic diagram of a structure of a network device according to an embodiment of this application.

FIG. 24 is a simplified schematic diagram of a structure of a network device according to an embodiment of this application. The network device includes a part for radio frequency signal transmission/reception and conversion and a part 42. The part for radio frequency signal transmission/reception and conversion further includes a receiving module part 41 and a sending module part 43 (which may also be collectively referred to as a transceiver module). The part for radio frequency signal transmission/reception and conversion is mainly configured to: send/receive a radio frequency signal and perform conversion between a radio frequency signal and a baseband signal. The part 42 is mainly configured to: perform baseband processing, control the network device, and the like. The receiving module 41 may also be referred to as a receiver, a receiver circuit, or the like. The sending module 43 may also be referred to as a transmitter, a transmitter circuit, or the like. The part 42 is usually a control center of the network device, and may be usually referred to as a processing module, and is configured to control the network device to perform the steps performed by the transmitting end device or the receiving end device in FIG. 19. For details, refer to the foregoing descriptions of the related parts.

The part 42 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, for the network device, the sending module 43 is configured to perform the function of the transmitting end device or the receiving end device in the embodiment in FIG. 19.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. An antenna, comprising:
   a dielectric plate comprising a first surface and a second surface;
   a ground plane on the first surface; and
   an antenna circuit, wherein a size of the antenna circuit is a preset length, the antenna circuit comprises at least three antenna elements in a ring arrangement, and each of the at least three antenna elements comprises a first patch, a second patch, and a third patch that are located on the second surface, each of the at least three antenna elements comprises three conductive portions that respectively penetrate through the first surface and the second surface, and a feeding portion connected to the first surface, wherein in each of the at least three antenna elements a first conductive portion is electrically connected between the feeding portion and the first patch of the respective antenna element to form a monopole, a second conductive portion is electrically connected between the ground plane and the second patch of the respective antenna element to form a first parasitic body, a third conductive portion is electrically connected between the ground plane and the third patch of the respective antenna element to form a second parasitic body, and the first parasitic body and the second parasitic body are located on both sides of the monopole of the respective antenna element and are configured to isolate adjacent antenna elements in the ring arrangement.

2. The antenna according to claim 1, wherein the preset length is half a wavelength.

3. The antenna according to claim 1, wherein either of the first parasitic body or the second parasitic body is located between monopoles of the adjacent antenna elements in the at least three antenna elements.

4. The antenna according to claim 1, wherein the first patch, the second patch, and the third patch of at least one antenna element of the at least three antenna elements are electrically connected.

5. The antenna according to claim 1, wherein a gap or an electrical connection is between the second patch of at least one antenna element of the at least three antenna elements and a third patch of an adjacent antenna element.

6. The antenna according to claim 5, wherein the second patch of the at least one antenna element of the at least three antenna elements and the third patch of the adjacent antenna element are electrically connected to at least two conductive portions, and the at least two conductive portions are electrically connected to the ground plane.

7. The antenna according to claim 1, wherein a conductive portion corresponding to the second patch of the at least three antenna elements is a conductive portion corresponding to the third patch of the adjacent antenna element.

8. The antenna according to claim 1, wherein the ring arrangement comprises a first ring arrangement and a second ring arrangement, and the first ring arrangement is obtained by rotating the second ring arrangement by a preset angle at a geometric center of the antenna.

9. The antenna according to claim 1, wherein gaps are among the first patch, the second patch, and the third patch of at least one antenna element of the at least three antenna elements.

10. An antenna, comprising:
a first dielectric plate comprising a first surface and a second surface;
a second dielectric plate comprising a third surface and a fourth surface;
a ground plane on the first surface; and
an antenna circuit, wherein a size of the antenna circuit is a preset length, the antenna circuit comprises at least four antenna elements in a ring arrangement, and each of the at least four antenna elements comprises a first patch, a second patch, and a third patch;

wherein each of the at least four antenna elements comprises three conductive portions that respectively penetrate through at least the first surface and the second surface;

wherein the at least four antenna elements comprise a first antenna element, the third patch of the first antenna element is on the second surface of the first dielectric plate, and the second patch and the third patch of the first antenna element are on the fourth surface of the second dielectric plate;

wherein the antenna circuit further comprises a feeding portion connected to the first surface;

wherein in each of the at least four antenna elements a first conductive portion is electrically connected between the feeding portion and the first patch of the respective antenna element to form a monopole, a second conductive portion is electrically connected between the ground plane and the second patch of the respective antenna element to form a first parasitic body, a third conductive portion is electrically connected between the ground plane and the third patch of the respective antenna element to form a second parasitic body, and the first parasitic body and the second parasitic body are located on both sides of the monopole of the respective antenna element and are configured to isolate adjacent antenna elements in the ring arrangement.

11. The antenna according to claim 10, wherein the at least four antenna elements further comprise a second antenna element, the first patch of the second antenna element is located on the second surface of the first dielectric plate, and the second patch and the third patch of the second antenna element are located on the fourth surface of the second dielectric plate.

12. The antenna according to claim 10, wherein the at least four antenna elements further comprise a third antenna element, and the first patch, the second patch, and the third patch of the third antenna element are located on the fourth surface of the second dielectric plate.

13. The antenna according to claim 10, wherein the preset length is half a wavelength.

14. The antenna according to claim 10, wherein the first parasitic body is located between monopoles of adjacent antenna elements in the at least four antenna elements.

15. The antenna according to claim 10, wherein the second parasitic body is located between monopoles of adjacent antenna elements in the at least four antenna elements.

16. The antenna according to claim 10, wherein the first patch, the second patch, and the third patch of at least one antenna element of the at least four antenna elements are electrically connected.

17. The antenna according to claim 10, wherein gaps are among the first patch, the second patch, and the third patch of at least one antenna element of the at least four antenna elements.

18. The antenna according to claim 10, wherein a gap is between the second patch of at least one antenna element of the at least four antenna elements and a third patch of an adjacent antenna element.

19. The antenna according to claim 10, wherein an electrical connection is between the second patch of at least one antenna element of the at least four antenna elements and a third patch of an adjacent antenna element.

* * * * *